United States Patent
Kawanai et al.

(10) Patent No.: US 11,680,820 B2
(45) Date of Patent: *Jun. 20, 2023

(54) MAP INFORMATION SYSTEM

(71) Applicant: TOYOTA JIDOSHA KABUSHIKI KAISHA, Toyota (JP)

(72) Inventors: Taichi Kawanai, Susono (JP); Yasuhiro Takagi, Toyota (JP); Masahiro Harada, Hadano (JP); Nobuhide Kamata, Susono (JP); Eiji Sakaguchi, Shizuoka-ken (JP); Keisuke Hokai, Susono (JP); Hideyuki Matsui, Shizuoka-ken (JP); Kazuhiko Kamikado, Susono (JP); Yusuke Hayashi, Susono (JP); Hideo Fukamachi, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

This patent is subject to a terminal disclaimer.

(21) Appl. No.: 16/660,274

(22) Filed: Oct. 22, 2019

(65) Prior Publication Data
US 2020/0139979 A1 May 7, 2020

(30) Foreign Application Priority Data

Nov. 5, 2018 (JP) .............................. JP2018-208232
Jan. 22, 2019 (JP) .............................. JP2019-008828

(51) Int. Cl.
*G01C 21/00* (2006.01)
*B60W 30/09* (2012.01)
(Continued)

(52) U.S. Cl.
CPC ........... *G01C 21/387* (2020.08); *B60W 30/09* (2013.01); *B60W 30/182* (2013.01);
(Continued)

(58) Field of Classification Search
CPC combination set(s) only.
See application file for complete search history.

(56) References Cited

U.S. PATENT DOCUMENTS 8,676,430 B1 3/2014 Ferguson et al.
8,825,264 B2 9/2014 Montemerlo et al.
(Continued)

FOREIGN PATENT DOCUMENTS

CN 106996793 A 8/2017
CN 108688666 A 10/2018
(Continued)

OTHER PUBLICATIONS

Non-Final Office Action dated Sep. 15, 2022 by the U.S. Patent and Trademark Office in U.S. Appl. No. 17/514,718.
(Continued)

*Primary Examiner* — Nicholas Kiswanto
*Assistant Examiner* — Madison B Emmett
(74) *Attorney, Agent, or Firm* — Sughrue Mion, PLLC

(57) ABSTRACT

A map information system includes a map database including map information; and a driving assist level determination device. The map information is associated with an evaluation value indicating a certainty of the map information for each location in an absolute coordinate system. Information indicating that the intervention operation is performed is included in driving environment information indicating a driving environment of a vehicle. The driving assist level determination device is configured to acquire, based on the driving environment information, intervention operation information indicating an intervention operation location where the intervention operation is performed, acquire, based on the map information, the evaluation value for each point or section in a target range, and determine, based on the evaluation value and the intervention operation
(Continued)

location, an allowable level for each point or section within the target range.

14 Claims, 25 Drawing Sheets

(51) Int. Cl.
*B60W 30/182* (2020.01)
*B60W 50/00* (2006.01)
*G01C 21/34* (2006.01)
*G08G 1/0967* (2006.01)
*G08G 1/16* (2006.01)

(52) U.S. Cl.
CPC ..... *B60W 50/0098* (2013.01); *G01C 21/3407* (2013.01); *G01C 21/3896* (2020.08); *G08G 1/096791* (2013.01); *G08G 1/161* (2013.01); *G08G 1/166* (2013.01); *B60W 2556/50* (2020.02)

(56) References Cited

U.S. PATENT DOCUMENTS

| | | | |
|---|---|---|---|
| 9,188,985 B1* | 11/2015 | Hobbs | G01C 21/3626 |
| 10,451,428 B2* | 10/2019 | Lathrop | G05D 1/02 |
| 10,935,385 B2 | 3/2021 | Ohyama et al. | |
| 2008/0009964 A1 | 1/2008 | Bruemmer et al. | |
| 2017/0010618 A1* | 1/2017 | Shashua | B60W 30/18 |
| 2017/0122749 A1 | 5/2017 | Urano et al. | |
| 2017/0161910 A1 | 6/2017 | Aghamohammadi et al. | |
| 2018/0023966 A1 | 1/2018 | Iwai et al. | |
| 2018/0056991 A1 | 3/2018 | Sogen | |
| 2018/0056992 A1 | 3/2018 | Sogen et al. | |
| 2018/0113460 A1 | 4/2018 | Koda et al. | |
| 2018/0127001 A1* | 5/2018 | Ricci | B60R 25/24 |
| 2018/0239352 A1* | 8/2018 | Wang | B60W 30/182 |
| 2018/0292833 A1* | 10/2018 | You | G05D 1/0212 |
| 2019/0049259 A1* | 2/2019 | Galan-Oliveras | G01C 21/3461 |
| 2019/0162856 A1 | 5/2019 | Atalla | |
| 2020/0064138 A1* | 2/2020 | Takahama | G01C 21/30 |

FOREIGN PATENT DOCUMENTS

| | | |
|---|---|---|
| JP | 2007-101690 A | 4/2007 |
| JP | 2013-544695 A | 12/2013 |
| JP | 2018-32333 A | 3/2018 |
| JP | 2018-088060 A | 6/2018 |
| WO | 2012/047743 A2 | 4/2012 |
| WO | 2016/139748 A1 | 9/2016 |
| WO | 2016/152873 A1 | 9/2016 |
| WO | 2017/051478 A1 | 3/2017 |

OTHER PUBLICATIONS

Office Action dated Sep. 15, 2022 by the U.S. Patent and Trademark Office in U.S. Appl. No. 17/548,116.
Office Action dated Dec. 7, 2022 by the US Patent Office in U.S. Appl. No. 17/548,116.
Office Action dated Dec. 7, 2022 by the US Patent Office in U.S. Appl. No. 17/514,718.
Notice of Allowance dated Feb. 16, 2023 which issued during the prosecution of U.S. Appl. No. 17/514,718.
Notice of Allowance dated Feb. 22, 2023 which issued during the prosecution of U.S. Appl. No. 17/548,116.

\* cited by examiner

< MAP INFORMATION MAP >

| BASE MAP INFORMATION | EVALUATION VALUE P |
|---|---|
| ... | ... |
| ... | ... |
| ⋮ | ⋮ |

< STATIONARY OBJECT MAP INFORMATION BG_MAP >

| LOCATION [X, Y, Z] | OCCUPANCY R | EVALUATION VALUE P | < EVALUATION INFORMATION ><br>- NUMBER OF TIMES OF MEASUREMENT N<br>- VARIANCE V<br>- OCCUPANCY R |
|---|---|---|---|

FIG. 25
< TERRAIN MAP INFORMATION TE_MAP >
| LOCATION [X, Y] | HEIGHT Z | EVALUATION VALUE P | < EVALUATION INFORMATION > - NUMBER OF TIMES OF MEASUREMENT - VARIANCE |
|---|---|---|---|
FIG. 26
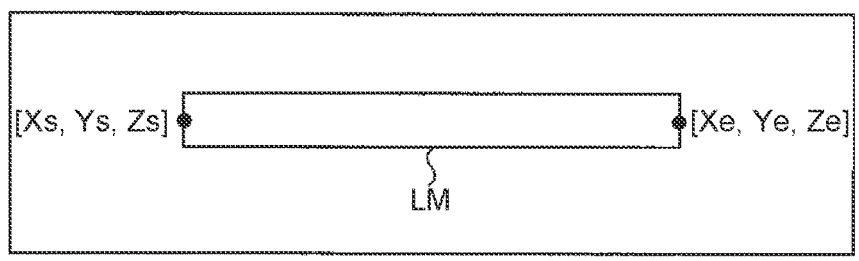
< CHARACTERISTIC OBJECT MAP INFORMATION FE_MAP >
| LOCATIONS [Xs, Ys, Zs] [Xe, Ye, Ze] | EVALUATION VALUE P | < EVALUATION INFORMATION > - NUMBER OF TIMES OF MEASUREMENT - VARIANCE - OWN-LOCATION ESTIMATION ERROR |
|---|---|---|
FIG. 27
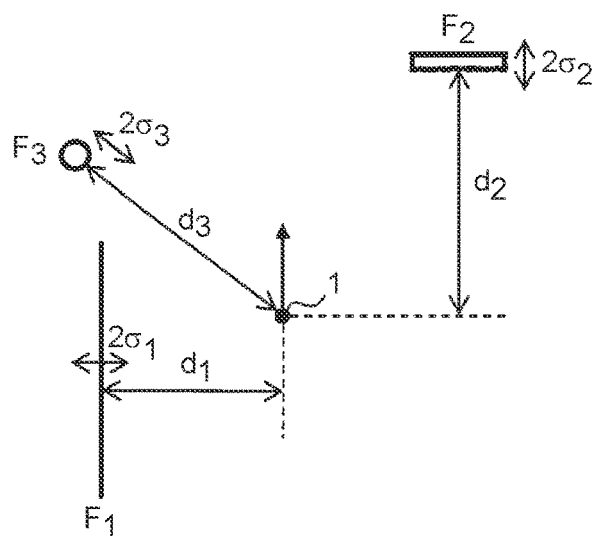

< TRACK MAP INFORMATION TR_MAP >

| LOCATION [X, Y, Z] | EVALUATION VALUE P | < EVALUATION INFORMATION ><br>- ACTUAL TRACK AT TIME OF MANUAL DRIVING<br>- CENTER POSITION OF LANE<br>- CURVATURE OF TRACK |

MAP INFORMATION SYSTEM

INCORPORATION BY REFERENCE

The disclosure of Japanese Patent Application No. 2019-008828 filed on Jan. 22, 2019 including the specification, drawings and abstract is incorporated herein by reference in its entirety.

BACKGROUND

1. Technical Field

The present disclosure relates to a map information system.

2. Description of Related Art

WO 2016/139748 discloses a route searching device that notifies a user about a location unsuitable for autonomous driving. A location unsuitable for autonomous driving is a location where the detection accuracy of a sensor does not satisfy criteria that are set for acquiring periphery information necessary for autonomous driving. Examples of the location unsuitable for autonomous driving may include a heavy rain section, a road surface freezing section, a dense fog section, and a section where a lane marking or an indicator is undetectable with a sensor. The route searching device predicts the locations unsuitable for autonomous driving, and notifies a user about the predicted locations unsuitable for autonomous driving.

U.S. Pat. No. 8,676,430 discloses a vehicle that performs autonomous driving based on map information. Whether the map information is inadequate or not is determined by comparing the map information with sensor detection information. When the map information is determined to be inadequate, the vehicle performs autonomous driving with use of sensor detection information as additional information, while encouraging the user to switch to manual driving.

U.S. Pat. No. 8,825,264 discloses a technique related to zone driving by an autonomous driving system. In the technique, a road map (road graph) includes zones associated with specific rules. When a vehicle approaches a zone, the autonomous driving system notifies a driver that the vehicle is approaching the zone, and requests the driver to perform control (steering, acceleration and deceleration) corresponding to the specific rules.

Japanese Patent Application Publication No. 2018-088060 discloses an autonomous driving device that executes autonomous driving control of a vehicle. The autonomous driving device switches operating states of the vehicle, between an autonomous driving state and a semi-autonomous driving state, in consideration of the location where the vehicle travels.

Japanese Patent Application Publication No. 2007-101690 discloses a map updating device mounted on a vehicle. Map information includes road geometries and locations of a plurality of marks. The map updating device detects a mark in the periphery of the vehicle with a sensor, and estimates a vehicle location with a high degree of accuracy with use of the detected mark. The map updating device calculates road geometries based on the estimated vehicle location, and updates the map information based on the road geometries.

WO 2017/051478 discloses a driving assist device. A map database stores map data. The map data includes driving automation levels indicating the automation levels of autonomous driving control that are associated with every predetermined section of the roads. The driving assist device generates guiding information corresponding to the driving automation level in a current location of an own vehicle and in front of the own vehicle. For example, the driving assist device displays information on a change point of the driving automation levels.

SUMMARY

Driving assist control that assists driving of a vehicle will be considered. As the level of the driving assist control becomes higher, the load of a driver of the vehicle is lessened more. It is preferable, from a perspective of the convenience of the driver, to automatically determine an appropriate level of driving assist control.

The present disclosure provides a map information system capable of automatically determining an appropriate level of driving assist control that assists driving of a vehicle.

A first aspect of the present disclosure map is an information system. The system includes: a map database and a driving assist level determination device. The map database includes map information used for driving assist control for assisting driving of a vehicle. The driving assist level determination device is configured to determine an allowable level of the driving assist control that is allowed when the vehicle travels in a target range. The map information is associated with an evaluation value indicating a certainty of the map information for each location in an absolute coordinate system. The driving assist level determination device is configured to acquire, based on driving environment information indicating a driving environment of the vehicle, intervention operation information indicating an intervention operation location that is a location where an intervention operation is performed, the intervention operation being an operation performed by a driver of the vehicle to intervene in the driving assist control during execution of the driving assist control, the driving environment information including information indicating that the intervention operation has been performed, acquire, based on the map information, the evaluation value for each point or section within the target range, and determine, based on the evaluation value and the intervention operation location, the allowable level for each point or section within the target range.

In the map information system according to the first aspect, the allowable level in the intervention operation location may be equal to or less than the allowable level in a normal location that is not the intervention operation location, on condition that the evaluation values in the intervention operation location and the normal location are identical.

In the above configuration, the driving assist level determination device may be configured to set the allowable level to a first level in the location where the evaluation value is less than a threshold, set the allowable level to a second level that is higher than the first level in the location where the evaluation value is equal to or more than the threshold, and increase the threshold in the intervention operation location so as to be larger than the threshold in the normal position.

In the above configuration, the driving assist level determination device may be configured to maintain the evaluation value in the normal position while reducing the evaluation value in the intervention operation location so as to acquire a corrected evaluation value, set the allowable level to a first level in the location where the corrected evaluation value is less than a threshold, and set the allowable level to a second level that is higher than the first level in the location where the corrected evaluation value is equal to or more than the threshold.

The map information system according to the first aspect may further include a database management device configured to manage the map database. The database management device may be configured to acquire the intervention operation information from the driving environment information, and update the map database so as to reduce the evaluation value in the intervention operation location. The driving assist level determination device may be configured to set the allowable level to a first level in the location where the evaluation value is less than a threshold, and set the allowable level to a second level that is higher than the first level in the location where the evaluation value is equal to or more than the threshold.

The map information system according to the above configuration may further include a driving assist controller configured to perform the driving assist control of the allowable level, based on the driving environment information and the map information.

The map information system according to the above configuration may further include a display device mounted on the vehicle. The driving assist level determination device may be configured to determine the allowable level along the target route for the vehicle to travel. The driving assist controller may be configured to display on the display device a transition of the allowable level from a current location or current time.

A second aspect of the present disclosure is a map information system. The system includes: a storage device and one or more processors. The storage device is configured to store a map database including map information used for driving assist control for assisting driving of a vehicle. The map information is associated with an evaluation value indicating a certainty of the map information for each location in an absolute coordinate system. The one or more processors are configured to acquire, based on driving environment information indicating a driving environment of the vehicle, intervention operation information indicating an intervention operation location that is a location where an intervention operation is performed, the intervention operation being an operation performed by a driver of the vehicle to intervene in the driving assist control during execution of the driving assist control, the driving environment information including information indicating that the intervention operation has been performed, acquire, based on the map information, the evaluation value for each point or section in a target range, and determine, based on the evaluation value and the intervention operation location, an allowable level of the driving assist control that is allowed when the vehicle travels within the target range, for each point or section within the target range.

In the map information system according to the second aspect, the allowable level in the intervention operation location may be equal to or less than the allowable level in a normal location that is not the intervention operation location, on condition that the evaluation values in the intervention operation location and the normal location are identical.

According to the first and second aspects, the driving assist level determination device automatically determines the allowable level of the driving assist control within a target range. The driving assist level determination device determines the allowable level based on the evaluation value of the map information in particular. Since the evaluation value of the map information is taken into consideration, the allowable level is appropriately determined. As a result, the convenience for the driver of the vehicle is enhanced.

Furthermore, the driving assist level determination device determines the allowable level of the driving assist control based on the intervention operation location. The intervention operation represents the intention of a driver to drive. In the location where the intervention operation is performed, there is a possibility that a phenomenon undesirable for the driving assist control may be present. Therefore, taking the intervention operation location into consideration makes it possible to more appropriately determine the allowable level in the intervention operation location.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 25 is a conceptual view for describing an example of terrain map information in the embodiment of the present disclosure;

FIG. 26 is a conceptual view for describing an example of characteristic object map information in the embodiment of the present disclosure;

FIG. 27 is a conceptual view for describing an example of own-location estimation in the embodiment of the present disclosure;

DETAILED DESCRIPTION OF EMBODIMENTS

The embodiments of the present disclosure will be described below with reference to the accompanying drawings.

1. Outline
1-1. Driving Assist Control

Figure 1:
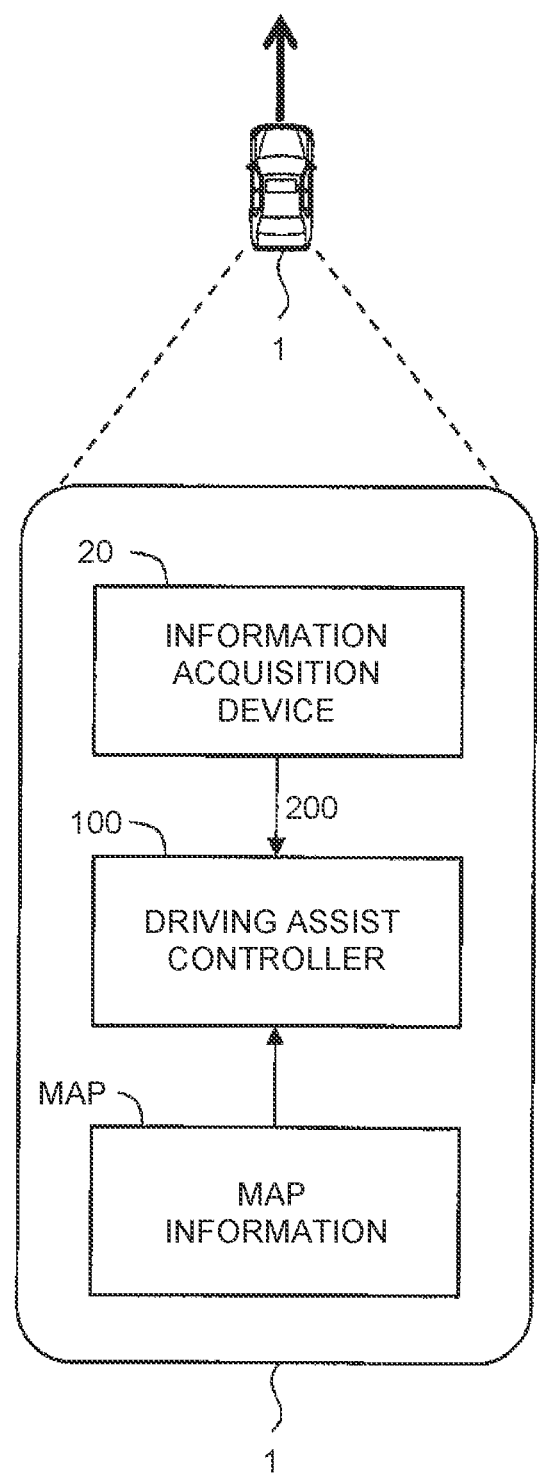
FIG. 1 is a conceptual view for describing a vehicle according to an embodiment of the present disclosure.

FIG. 1 is a conceptual view for describing a vehicle 1 according to an embodiment. The vehicle 1 is mounted with an information acquisition device 20 and a driving assist controller 100.

The information acquisition device 20 acquires various pieces of information using a sensor mounted on the vehicle 1. The information acquired with the sensor mounted on the vehicle 1 is the information indicating a driving environment of the vehicle 1. Hereinafter, the information is called "driving environment information 200." For example, the driving environment information 200 includes vehicle location information indicating the location of the vehicle 1, vehicle state information indicating the state of the vehicle 1, and peripheral condition information indicating the conditions around the vehicle 1.

The driving assist controller 100 performs driving assist control for assisting driving of the vehicle 1 based on the driving environment information 200. The driving assist control typically includes at least one of steering control, acceleration control, and deceleration control. Examples of such driving assist control may include autonomous driving control, path-following control, lane tracing assist control, collision avoidance control, and adaptive cruise control (ACC).

In the driving assist control, map information MAP is often used. The map information MAP provides various pieces of information associated with location. The location is an absolute location defined in an absolute coordinate system (latitude, longitude, and altitude). The map information MAP is not limited to general road maps or navigation maps. Rather, the map information MAP may include maps in various perspectives. For example, the map information MAP may indicates the location of stationary objects (example: guardrails and walls) on roads, road surfaces, and characteristic objects (example: lane markings, poles, and signboards).

In the present embodiment, the driving assist control is classified into a plurality of levels (stages). The levels of the driving assist control are hereinafter called "driving assist levels." Among the driving assist levels, the height of the levels can be compared. In the higher driving assist level, the driving assist controller 100 performs more driving operations. It can be said that the driving assist levels represent the degrees (commission degrees) that a driver commits the driving of the vehicle 1 to the driving assist controller 100.

Figure 2:
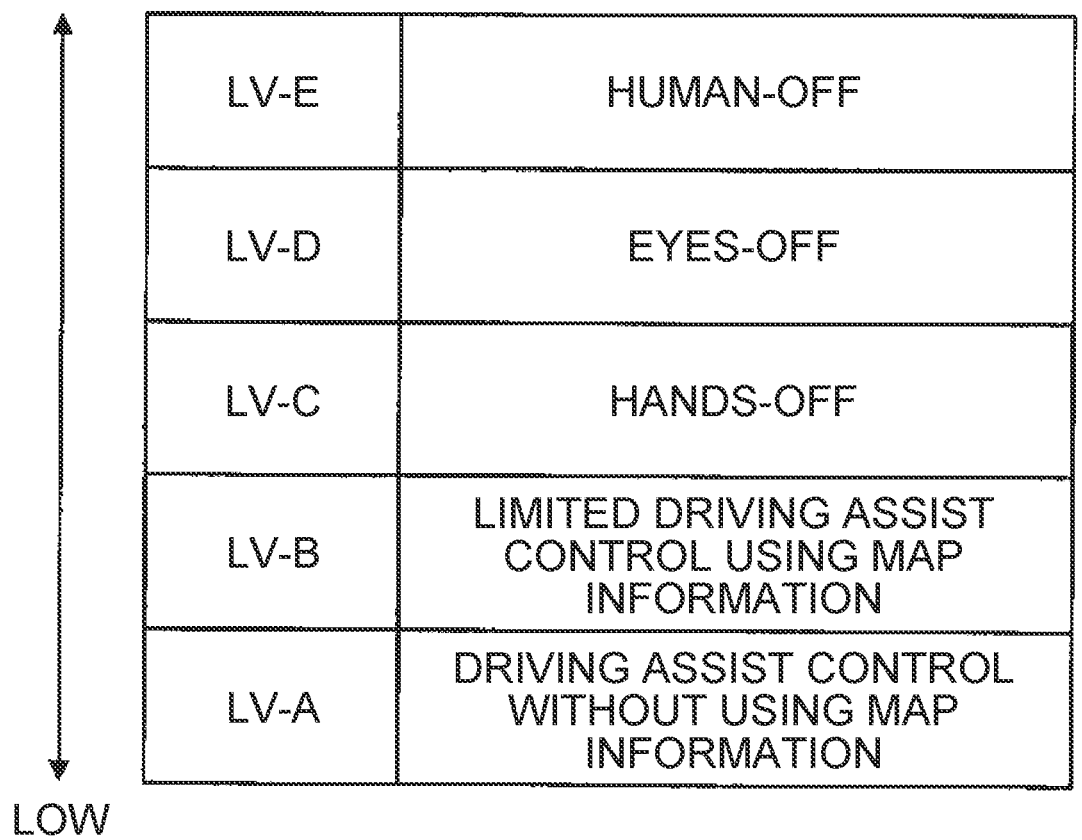
FIG. 2 is a conceptual view for describing an example of a plurality of driving assist levels in the embodiment of the present disclosure.

FIG. 2 is a conceptual view for describing an example of the driving assist levels. A driving assist level LV-A is the lowest, and a driving assist level LV-E is the highest. For example, the contents of the driving assist levels LV-A to LV-E are as follows.

[LV-A] Driving assist control without using the map information MAP (example: adaptive cruise control).

[LV-B] Limited driving assist control using the map information MAP (example: adaptive cruise control+lane tracing assist control).

[LV-C] Driving assist control using the map information MAP. The driving assist controller 100 performs steering control. A driver may put the hands off the steering wheel (hands-off). The driver is required to monitor the conditions around the vehicle 1. The driver performs manual driving as necessary.

[LV-D] Driving assist control using the map information MAP. The driving assist controller 100 performs steering control, acceleration control, and deceleration control. The driver does not need to monitor the conditions around the vehicle 1 (eyes-off). However, at the time of emergency, the driving assist controller 100 issues "transition demand" that is a demand for the driver to start manual driving. In response to the transition demand, the driver starts manual driving within a prescribed time.

[LV-E] Driving assist control using the map information MAP. The driving assist controller 100 performs steering control, acceleration control, and deceleration control. The driver does not need to monitor the conditions around the vehicle 1. At the time of emergency, the driving assist controller 100 automatically retreats the vehicle 1 to a safe location.

The classification of the driving assist levels is not limited to the classification shown in FIG. 2. For example, each of the driving assist levels may further be divided into subdivisions. In another example, the classification of the driving assist levels may coincide with the classification of generally used autonomous driving levels.

The accuracy of the driving assist control is dependent on the quality of the map information MAP. As the quality of the map information MAP is improved more, the accuracy of the driving assist control becomes higher, which makes it possible to conduct the driving assist control of a higher level. Hereinafter, a map information system that handles the map information MAP will be described.

1-2. Summary of Map Information System

Figure 3:
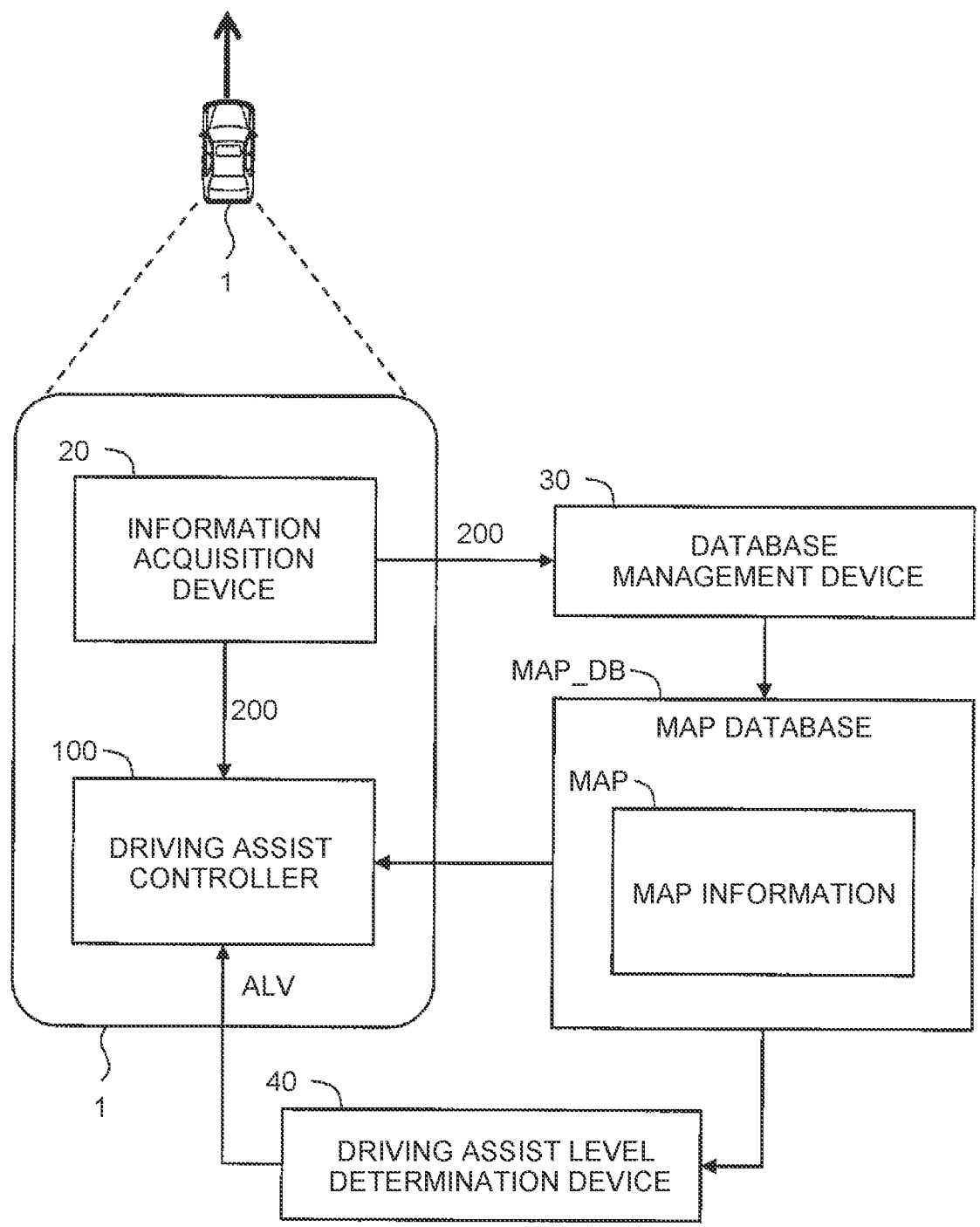
FIG. 3 is a block diagram conceptually showing the configuration of a map information system according to the embodiment of the present disclosure.

FIG. 3 is a block diagram schematically showing the configuration of the map information system 10 according to the embodiment of the present disclosure. The map information system 10 is a system that manages and uses the map information MAP. More specifically, the map information system 10 includes a map database MAP_DB, the information acquisition device 20, a database management device 30, and a driving assist level determination device 40. The map information system 10 may further include the aforementioned driving assist controller 100.

The map database MAP_DB is an assembly of the map information MAP that is used for the driving assist control. The map database MAP_DB may be stored in a storage device of the vehicle 1, or may be stored in an external device outside the vehicle 1.

The database management device 30 manages the map database MAP_DB. More specifically, the database management device 30 acquires the driving environment information 200 from the information acquisition device 20, and manages the map database MAP_DB based on the driving environment information 200. Management of the map database MAP_DB includes at least one of generation and update of the map information MAP. The management of the map database MAP_DB may include sharing of the map information MAP. The generation and update of the map information MAP will be described in detail in Sections 5 and 6 described later.

The database management device 30 may be mounted on the vehicle 1, or be included in an external device outside the vehicle 1. Alternatively, the database management device 30 may be disposed in the vehicle 1 and the external device in a distributed manner.

The driving assist level determination device 40 automatically determines the driving assist level that is allowed when the vehicle 1 travels in a target range. For example, the target range is a range along a target route for the vehicle 1 to travel. An allowable maximum driving assist level is hereinafter called "allowable level ALV." As described before, as the quality of the map information MAP is improved more, the accuracy of the driving assist control becomes higher, which makes it possible to conduct the driving assist control of a higher level. Therefore, the driving assist level determination device 40 automatically determines the allowable level ALV of the driving assist control at least based on the map information MAP.

The driving assist level determination device 40 may be mounted on the vehicle 1, or be included in an external device outside the vehicle 1. Alternatively, the driving assist level determination device 40 may be disposed in the vehicle 1 and the external device in a distributed manner.

The driving assist controller 100 performs driving assist control based on the driving environment information 200 and the map information MAP. At the time, the driving assist controller 100 performs driving assist control of an allowable level ALV that is determined by the driving assist level determination device 40.

Hereinafter, the determination method of the allowable level ALV by the driving assist level determination device 40 will be described in more detail.

1-3. Determination of Acceptable Level Based on Map Information

The map information MAP is associated with a location (absolute location) in an absolute coordinate system. According to the present embodiment, the map information MAP is further associated with "evaluation value P" indicating "certainty" of the map information MAP for each location in the absolute coordinate system. The certainty can also be expressed as accuracy or reliability. The evaluation value P can also be expressed as a score.

Figures 4, 5:
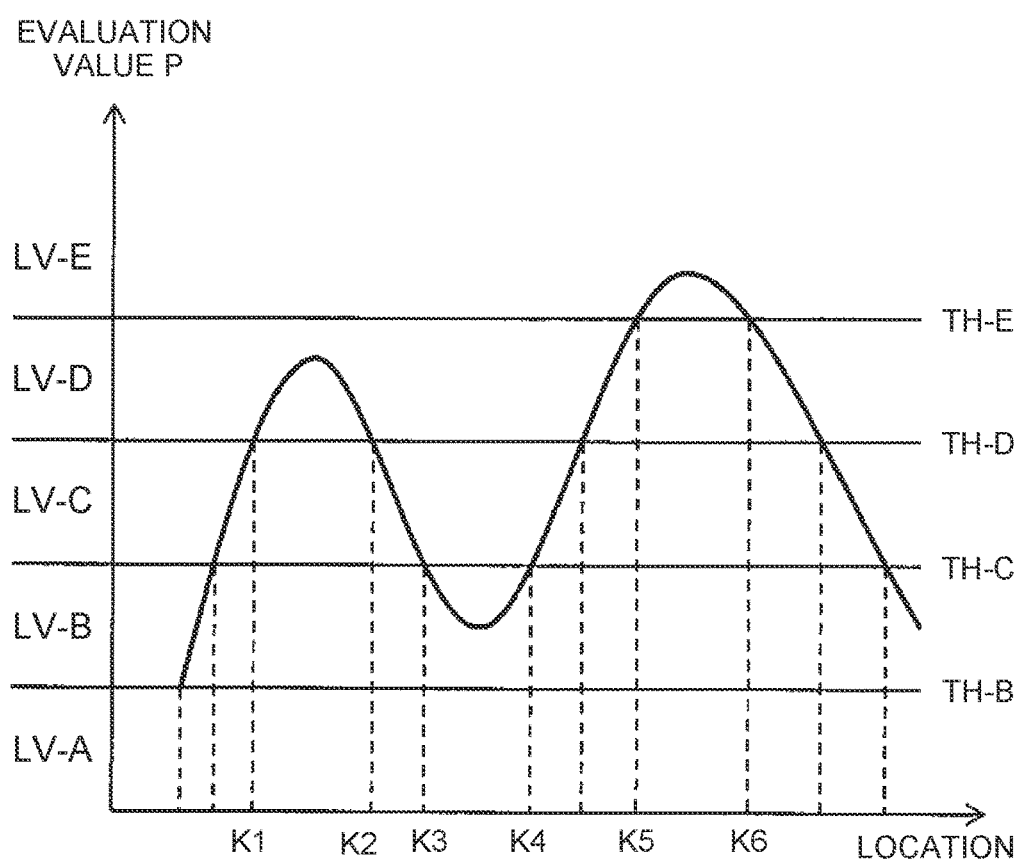
FIG. 4 is a conceptual view for describing an example of map information in the embodiment of the present disclosure.
FIG. 5 is a conceptual view for describing an example of a determination method of an allowable level by a driving assist level determination device according to the embodiment of the present disclosure.

FIG. 4 is a conceptual view for describing an example of the map information MAP in the present embodiment. In the example shown in FIG. 4, the map information MAP includes base map information and the evaluation value P. The base map information is associated with an absolute location. The base map information is main information on the map information MAP. The evaluation value P indicates a certainty of the base map information in terms of the absolute location. Base map information and an evaluation value P associated with the base map information constitute one data set.

For example, in the case of the map information MAP that indicates the location of a characteristic object, the base map information is information itself that indicates the location of the characteristic object. The evaluation value P indicates a certainty of the characteristic object present in the location indicated by the base map information. Various examples of the map information MAP and the evaluation value P will be described in detail in Section 5 later.

In the following description, the evaluation value P becomes higher as the certainty of the map information MAP is higher. However, the map information system may be designed such that the evaluation value P becomes higher as "uncertainty" of the map information MAP is higher (certainty is lower). In that case, the phrase "the evaluation value P is higher" is deemed to be replaced with "the evaluation value P is lower."

As the evaluation value P of the map information MAP is higher, the accuracy of the driving assist control using the map information MAP becomes higher, which makes it possible to conduct the driving assist control of a higher level. Therefore, in the present embodiment, the allowable level ALV of the driving assist control is determined in consideration of the evaluation value P of the map information MAP.

FIG. 5 is a conceptual view for describing an example of the determination method of the allowable level ALV. A horizontal axis represents a location within the target range where the vehicle 1 travels. A vertical axis represents the evaluation value P.

As shown in FIG. 5, a threshold TH is set for each of the driving assist levels. The threshold TH is a minimum evaluation value P required to conduct the driving assist control of each of the driving assist levels with sufficient accuracy. In other words, the threshold TH is the minimum evaluation value P required to allow each of the driving assist levels. For example, a threshold TH-C is the minimum evaluation value P required to allow the driving assist level LV-C. When the evaluation value P is less than the threshold TH-C, the driving assist level LV-C is not allowed. When the evaluation value P is equal to or more than the threshold TH-C, the driving assist level LV-C is allowed.

The allowable level ALV is an allowable maximum driving assist level. For example, in the location between a location K1 and a location K2, the allowable level ALV is a driving assist level LV-D. In the location between a location K3 and a location K4, the allowable level ALV is a driving assist level LV-B. In the location between a location K5 and a location K6, the allowable level ALV is a driving assist level LV-E.

The driving assist level determination device 40 acquires an evaluation value P for each point within a target range, based on the map information MAP (map database MAP_DB). At the time, the driving assist level determination device 40 may acquire the evaluation value P associated with the map information MAP as it is, or may process the evaluation value P associated with the map information MAP. The driving assist level determination device 40 further determines the allowable level ALV for each point within the target range, by comparing the evaluation value P with the threshold TH.

Figure 6:
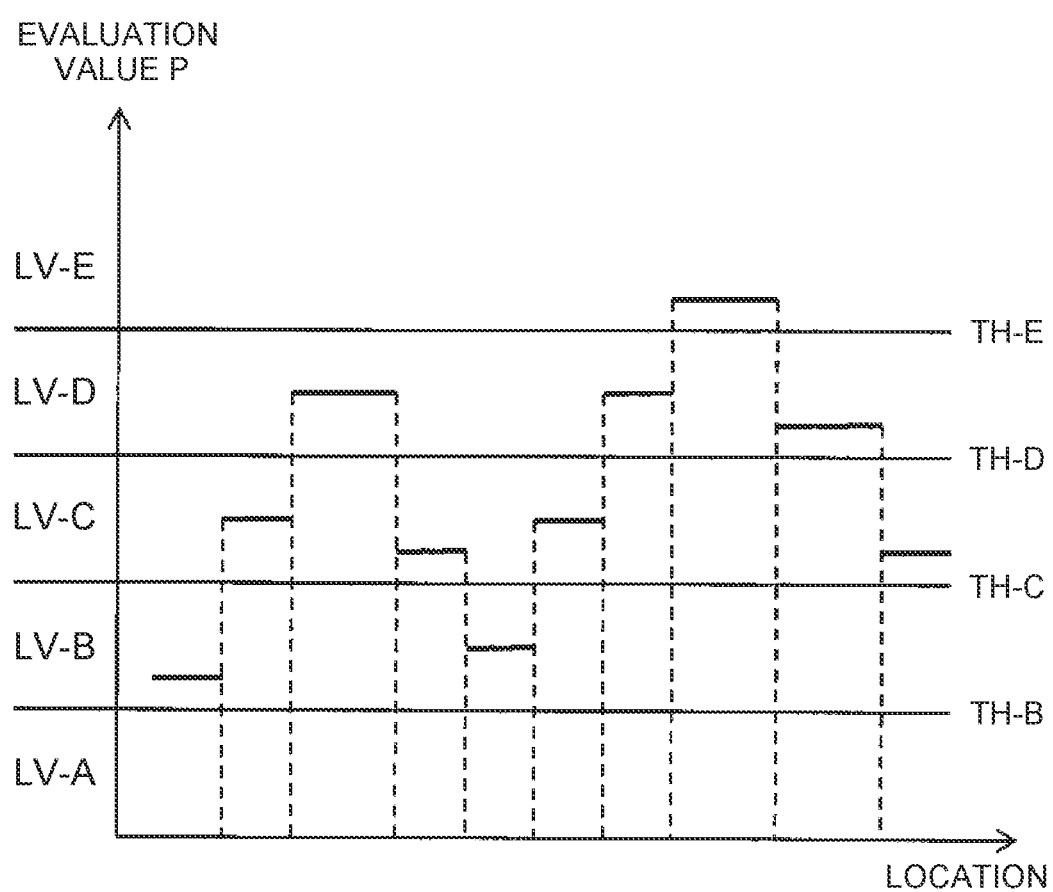
FIG. 6 is a conceptual view for describing another example of the determination method of the allowable level by the driving assist level determination device according to the embodiment of the present disclosure.

In another example, as shown in FIG. 6, the driving assist level determination device 40 may acquire an evaluation value P for each section within a target range. For example, an average of the evaluation values P in the respective points included in a certain section is calculated as the evaluation value P of the section. The driving assist level determination device 40 then compares the evaluation value P with the threshold TH to determine an allowable level ALV for each section within the target range.

Thus, the driving assist level determination device 40 acquires the evaluation value P for each point or section within the target range, based on the map information MAP. The driving assist level determination device 40 then determines the allowable level ALV for each point or section within the target range, based on the evaluation value P. Specifically, the driving assist level determination device 40 sets the allowable level ALV to a first level LV-1 in the location where the evaluation value P is less than the threshold TH. The driving assist level determination device 40 also sets the allowable level ALV to a second level LV-2 that is higher than first level LV-1 in the location where the evaluation value P is equal to or more than the threshold TH.

A combination of a plurality of types of map information MAP may be used for the driving assist control. In that case, the evaluation values P for the respective types of the map information MAP are used, and two or more allowable levels ALV are obtained for the same point or section. Setting of the threshold TH may be different among the respective types of the map information MAP. The driving assist level determination device 40 combines the allowable levels ALV to determine a final allowable level ALV. For example, the driving assist level determination device 40 selects the lowest allowable level ALV among the allowable levels ALV.

As described in the foregoing, the driving assist level determination device 40 automatically determines the allowable level ALV of the driving assist control in a target range. The driving assist level determination device 40 determines the allowable level ALV, based on the evaluation value P of the map information MAP in particular. This is because as the evaluation value P of the map information MAP is higher, the accuracy of the driving assist control using the map information MAP becomes higher. Since the evaluation value P of the map information is taken into consideration, the allowable level ALV is appropriately determined. As a result, the convenience for the driver of the vehicle 1 is enhanced. Moreover, since an inadequate driving assist control is restrained, safety is enhanced.

For example, when the evaluation value P of the map information MAP is low, the accuracy of the driving assist control based on the map information MAP may also become low. In this case, the allowable level ALV also automatically becomes low, and therefore the driving assist control is performed within a reasonable range. As a result, the discomfort the driver feels for the driving assist control is restrained. When the evaluation value P of the map information MAP is high, it becomes possible to conduct the driving assist control of a high level with sufficient accuracy. In this case, since the allowable level ALV becomes high, the convenience for the driver is enhanced.

1-4. Determination of Allowable Level Based on Map Information and Intervention Operation Information During execution of the driving assist control, the driver of the vehicle 1 may perform "intervention operation." The intervention operation is performed by the driver to intervene the driving assist control. For example, the intervention operation in the case of the driving assist control at the driving assist level LV-C (steering control) includes steering operation by the driver. In another example, the intervention operation in the case of the driving assist control at the driving assist level LVD (steering control, acceleration control, and deceleration control) includes at least one of the steering operation, accelerator operation, and brake operation by the driver. The intervention operation may include preparatory operation such as griping a steering wheel, or putting a foot on a pedal.

The intervention operation represents the intention of a driver to drive. In the location where the intervention operation is performed, there is a possibility that a phenomenon undesirable for the driving assist control may be present. Therefore, when generation of the intervention operation is further taken into consideration, it becomes possible to determine the allowable level ALV more appropriately.

Figure 7:
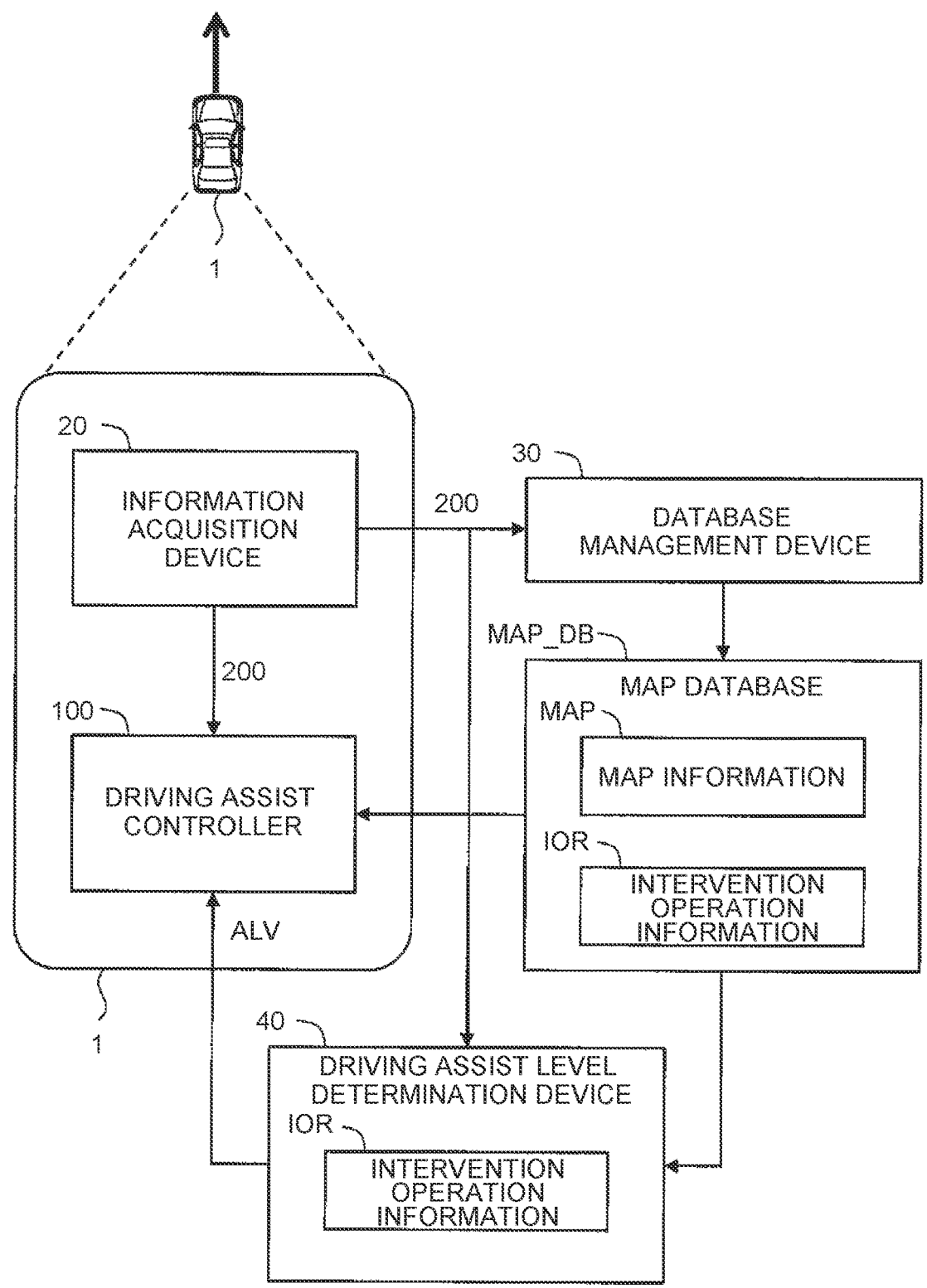
FIG. 7 is a block diagram schematically showing another example of the configuration of the map information system according to the embodiment of the present disclosure.

FIG. 7 is a block diagram schematically showing another example of the configuration of the map information system 10 according to the present embodiment. The description overlapped with the description in FIG. 3 is properly omitted.

The intervention operation by the driver of the vehicle 1 is detected by a sensor mounted on the vehicle 1. In short, the driving environment information 200 acquired by the information acquisition device 20 also includes the information indicating that the intervention operation is performed by the driver. An intervention operation location is the location where the intervention operation is performed. The intervention operation location is indicated by intervention operation information IOR.

The driving assist level determination device 40 acquires the intervention operation information IOR based on the driving environment information 200. For example, the driving assist level determination device 40 directly acquires the intervention operation information IOR from the driving environment information 200. Alternatively, the database management device 30 first acquires the intervention operation information IOR from the driving environment information 200, and registers the intervention operation information IOR in the map database MAP_DB. Then, the driving assist level determination device 40 acquires the intervention operation information IOR from the map database MAP_DB.

The driving assist level determination device 40 retains the intervention operation information IOR, and utilizes the intervention operation information IOR at the time of a subsequent travel of the vehicle 1. Specifically, the driving assist level determination device 40 determines the allowable level ALV of the driving assist control, based on the evaluation value P of the map information MAP and the intervention operation information IOR (intervention operation location).

Figure 8:
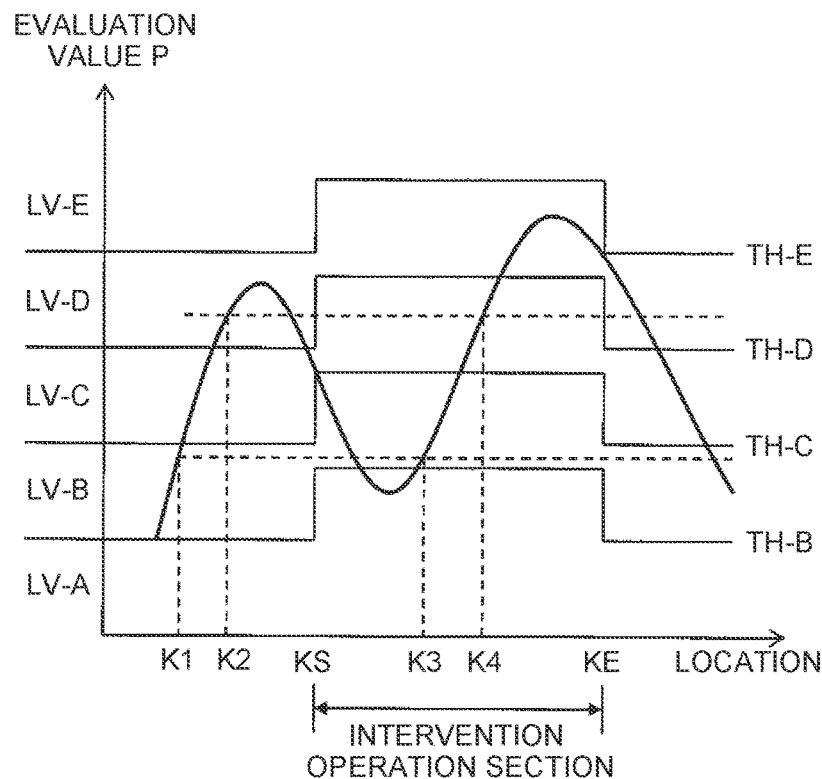
FIG. 8 is a conceptual view for describing still another example of the determination method of the allowable level by the driving assist level determination device according to the embodiment of the present disclosure.

FIG. 8 is a conceptual view for describing an example of the determination method of the allowable level ALV. The format of FIG. 8 is the same as the format described in FIGS. 5 and 6 before. A section between a location KS and a location KE is an intervention operation section where the intervention operation is performed by a driver. The intervention operation is not performed other than in the intervention operation section. The location where the intervention operation is not performed, that is, the location that is not the intervention operation location, is hereinafter called "normal location."

In the example shown in FIG. 8, the driving assist level determination device 40 increases the threshold TH in the intervention operation location so as to be larger than that in the normal location. As a result of the increase in the threshold TH, the allowable level ALV in the intervention operation location tends to lower. For example, a location K2 is a normal location and a location K4 is an intervention operation location. Although the evaluation values P in the location K2 and the location K4 are identical, the allowable level ALV (=LV–C) in the location K4 becomes lower than the allowable level ALV (=LV–D) in the location K2.

However, the increase in the threshold TH does not necessarily lower the allowable level ALV in the intervention operation location. For example, the location K1 is a normal location and a location K3 is an intervention operation location. The evaluation values P in the location K1 and the location K3 are identical. Although a threshold TH-B in the location K1 is different from a threshold TH-B in the location K3, their allowable levels ALV are both the driving assist level LV-B.

Thus, the driving assist level determination device 40 determines the allowable level ALV for each point or section within the target range, based on the evaluation value P of the map information MAP and the intervention operation location. On condition that the evaluation values P of the intervention operation location and the normal location are identical, the allowable level ALV in the intervention operation location is equal to or less than the allowable level ALV in the normal location. The intervention operation represents the intention of a driver to drive. In the intervention operation location, there is a possibility that a phenomenon undesirable for the driving assist control may be present. When the intervention operation location is taken into consideration, the allowable level ALV in the intervention operation location is determined more appropriately.

Figure 9:
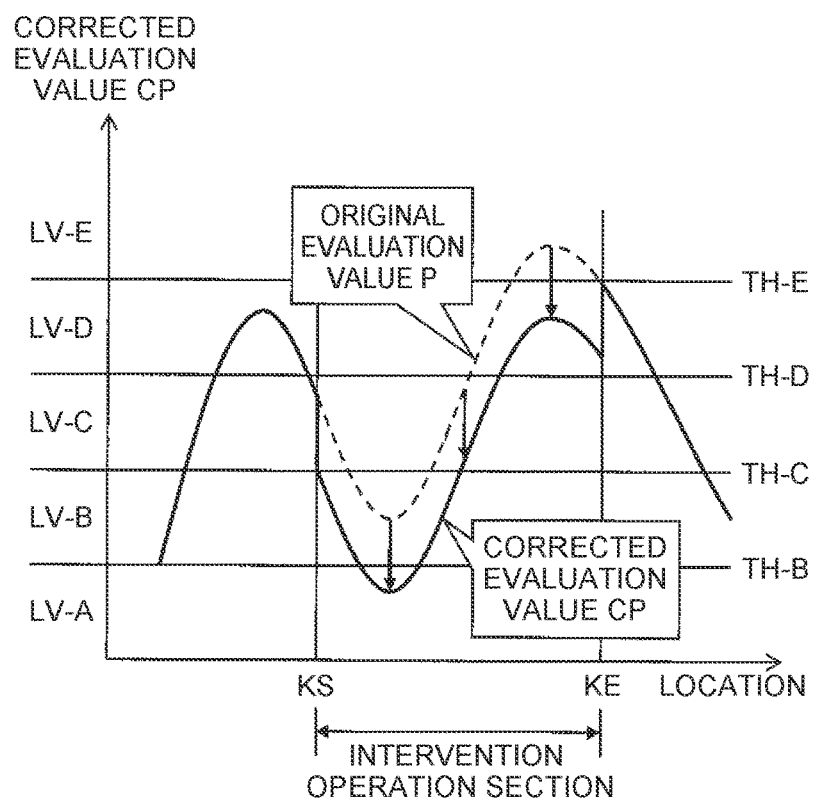
FIG. 9 is a conceptual view for describing yet another example of the determination method of the allowable level by the driving assist level determination device according to the embodiment of the present disclosure.

FIG. 9 is a conceptual view for describing another example of the determination method of the allowable level ALV. In the example shown in FIG. 9, the driving assist level determination device 40 corrects the evaluation value P instead of increasing the threshold TH. The evaluation value P after correction is hereinafter called "corrected evaluation value CP." More specifically, the driving assist level determination device 40 acquires the corrected evaluation value CP by reducing the evaluation value P in the intervention operation location. Meanwhile, the driving assist level determination device 40 maintains the evaluation value P in the normal location as it is, and uses it as the corrected evaluation value CP.

The driving assist level determination device 40 compares the corrected evaluation value CP instead of the evaluation value P, with the threshold TH. In short, the driving assist level determination device 40 sets the allowable level ALV to the first level LV-1 in the location where the corrected evaluation value CP is less than the threshold TH. The driving assist level determination device 40 also sets the allowable level ALV to the second level LV-2 that is higher than first level LV-1 in the location where the corrected evaluation value CP is equal to or more than the threshold TH.

The method shown in FIG. 9 can also provide the same effect as in the method shown in FIG. 8. In short, on condition that the evaluation values P in the intervention operation location and the normal location are identical, the allowable level ALV in the intervention operation location is equal to or less than the allowable level ALV in the normal location. Since the intervention operation location is taken into consideration, the allowable level ALV in the intervention operation location is determined more appropriately.

In yet another example, the database management device 30 may update, based on the intervention operation information IOR, the map database MAP_DB (map information MAP) so as to reduce the evaluation value P in the intervention operation location. After updating the map database MAP_DB, the driving assist level determination device 40 determines the allowable level ALV based on the evaluation value P of the map information MAP (see FIGS. 5 and 6). In this case, the intervention operation location is reflected upon the evaluation value P of the map information MAP, which can eliminate the necessity of changing the threshold TH (see FIG. 8) or calculating the corrected evaluation value CP (see FIG. 9).

1-5. Effects

As described in the foregoing, the driving assist level determination device 40 according to the present embodiment automatically determines the allowable level ALV of the driving assist control in a target range. The driving assist level determination device 40 determines the allowable level ALV, based on the evaluation value P of the map information MAP in particular. This is because as the evaluation value P of the map information MAP is higher, the accuracy of the driving assist control using the map information MAP becomes higher. Since the evaluation value P of the map information is taken into consideration, the allowable level ALV is appropriately determined. As a result, the convenience for the driver of the vehicle 1 is enhanced. Moreover, since an inadequate driving assist control is restrained, safety is enhanced.

Furthermore, the driving assist level determination device 40 may determine the allowable level ALV of the driving assist control based on the intervention operation location.

The intervention operation represents the intention of a driver to drive. In the location where the intervention operation is performed, there is a possibility that a phenomenon undesirable for the driving assist control may be present. Therefore, when the intervention operation location is taken into consideration, it becomes possible to more appropriately determine the allowable level ALV in the intervention operation location.

The driving assist controller 100 performs driving assist control at the allowable level ALV determined by the driving assist level determination device 40. The map information MAP can effectively be utilized by performing the driving assist control of an appropriate level corresponding to the evaluation value P of the map information MAP.

The map database MAP_DB, the database management device 30, and the driving assist level determination device 40 may be mounted on the vehicle 1. In short, all the component members of the map information system 10 may be mounted on the vehicle 1. In that case, the map information system 10 automatically executes all the operations within the vehicle 1, the operations including acquisition of the driving environment information 200, management of the map database MAP_DB based on the driving environment information 200, determination of the allowable level ALV, and driving assist control based on the map database MAP_DB. Such a map information system 10 can also be referred to as "self-learning driving assist control system." In the case where autonomous driving control is performed as the driving assist control in particular, such a map information system 10 can also be referred to as "self-learning autonomous driving system."

It can be said that the map database MAP_DB is knowledge that is useful for the driving assist control. It can be said that the map information system 10 according to the present embodiment automatically performs detection, verification, and accumulation of the knowledge.

Hereinafter, the map information system 10 according to the present embodiment will be described in more detail.

Figure 10:
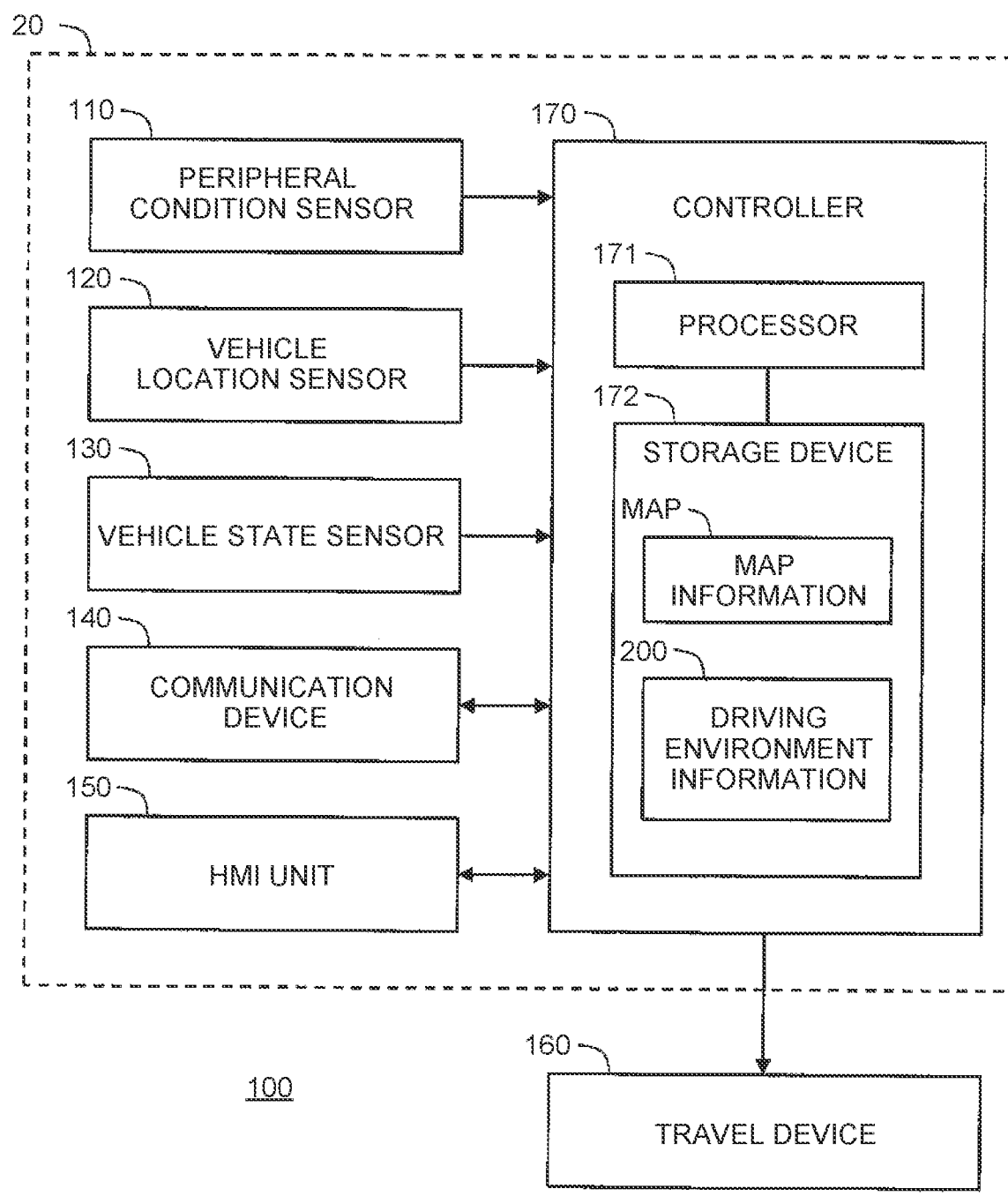
FIG. 10 is a block diagram showing a configuration example of a driving assist controller according to the embodiment of the present disclosure.

2. Configuration Example of Map Information System 2-1. Configuration Example of Driving Assist Controller FIG. 10 is a block diagram showing a configuration example of the driving assist controller 100 according to the present embodiment. The driving assist controller 100, which is mounted on the vehicle 1, includes a peripheral condition sensor 110, a vehicle location sensor 120, a vehicle state sensor 130, a communication device 140, a human machine interface (HMI) unit 150, a travel device 160, and a controller 170.

The peripheral condition sensor 110 detects the conditions around the vehicle 1. Examples of the peripheral condition sensor 110 may include a camera (imaging device), a laser imaging detection and ranging (LIDAR), and a radar. The camera images the conditions around the vehicle 1. The LIDAR detects a target around the vehicle 1 using a laser beam. The radar detects a target around the vehicle 1 using an electric wave.

The vehicle location sensor 120 detects the location and direction of the vehicle 1. For example, the vehicle location sensor 120 includes a global positioning system (GPS) sensor. The GPS sensor receives signals transmitted from a plurality of GPS Satellites, and calculates the location and direction of the vehicle 1 based on the received signals.

The vehicle state sensor 130 detects the state of the vehicle 1. The state of the vehicle 1 includes a speed (vehicle speed), an acceleration, a rudder angle, and a yaw rate of the vehicle 1. The state of the vehicle 1 also includes driving operation by the driver of the vehicle 1. The driving operation includes accelerator operation, brake operation, and steering operation.

The communication device 140 communicates with the outside of the vehicle 1. For example, the communication device 140 communicates with an external device outside the vehicle 1 through a communication network. The communication device 140 may perform a road-to-vehicle communication (V21 communication) with surrounding infrastructures. The communication device 140 may perform vehicle-to-vehicle communication (V2V communication) with peripheral vehicles.

The HMI unit 150 is an interface for providing a driver with information and receiving information from the driver. Specifically, the HMI unit 150 includes an input device and an output device. Examples of the input device may include a touch panel, a switch, and a microphone. Examples of the output device may include a display device, and a speaker.

The travel device 160 includes a steering unit, a drive unit, and a braking unit. The steering unit steers a wheel. The drive unit is a power source that generates drive power. Examples of the drive unit may include an electric motor and an engine. The braking unit generates braking force.

The controller 170 is a microcomputer including a processor 171 and a storage device 172. The controller 170 is also called an electronic control unit (ECU). When the processor 171 executes control programs stored in the storage device 172, various processes are implemented by the controller 170.

For example, the controller 170 acquires a necessary map information MAP from the map database MAP_DB. When the map database MAP_DB is installed in the vehicle 1, the controller 170 acquires the necessary map information MAP from the map database MAP_DB. When the map database MAP_DB is present outside the vehicle 1, the controller 170 acquires the necessary map information MAP through the communication device 140. The map information MAP is stored in the storage device 172, and is properly read and used.

The controller 170 also acquires the driving environment information 200. The driving environment information 200 is stored in the storage device 172, and is properly read and used.

Figure 11:
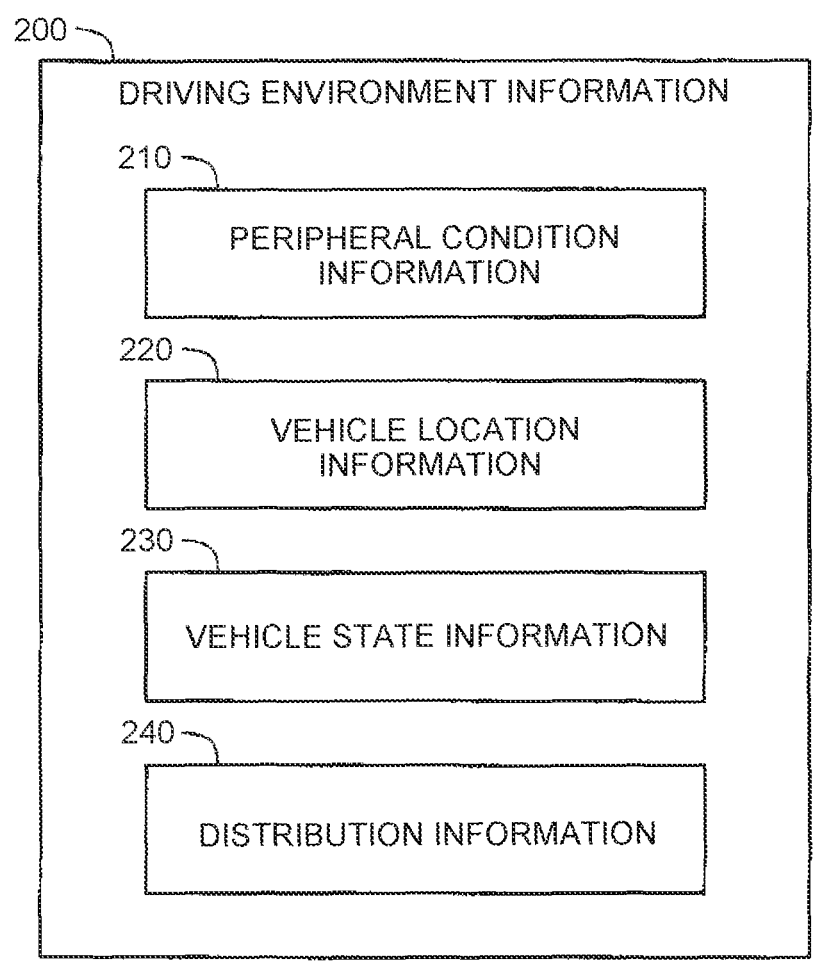
FIG. 11 is a block diagram showing an example of driving environment information used in the embodiment of the present disclosure.

FIG. 11 shows an example of the driving environment information 200. The driving environment information 200 includes peripheral condition information 210, vehicle location information 220, vehicle state information 230, and distribution information 240.

The peripheral condition information 210 indicates the conditions around the vehicle 1. The peripheral condition information 210 is information obtained from the result of detection by the peripheral condition sensor 110. For example, the peripheral condition information 210 includes imaging information obtained with the camera. The peripheral condition information 210 also includes measurement information by a LIDAR or a radar. The peripheral condition information 210 may also include target information regarding a target detected based on the imaging information or measurement information. Examples of the target around the vehicle 1 may include a stationary object, a characteristic object, a peripheral vehicle, and a pedestrian. The target information includes information such as a relative position and a relative speed of a detected target relative to the vehicle 1. The controller 170 acquires the peripheral condition information 210 based on the result of detection by the peripheral condition sensor 110.

The vehicle location information 220 indicates the location and direction of the vehicle 1. The controller 170 acquires the vehicle location information 220 from the vehicle location sensor 120. The controller 170 may further perform a well-known own-location estimation (localization) using the target information included in the peripheral condition information 210 to increase the accuracy of the vehicle location information 220.

The vehicle state information 230 indicates the state of the vehicle 1. The state of the vehicle 1 includes a speed (vehicle speed), an acceleration, a rudder angle, and a yaw rate of the vehicle 1. The state of the vehicle 1 further includes driving operation by the driver of the vehicle 1. The driving operation includes accelerator operation, brake operation, and steering operation. The controller 170 acquires the vehicle state information 230 from the vehicle state sensor 130.

The intervention operation includes at least one of the steering operation, the accelerator operation, and the brake operation by the driver. The vehicle state information 230 also includes information indicating that the intervention operation is performed by the driver.

The distribution information 240 is information obtained through the communication device 140. The controller 170 acquires the distribution information 240 by communicating with the outside using the communication device 140. For example, the distribution information 240 includes road traffic information (such as construction section information, accident information, traffic control information, and traffic congestion information) distributed from infrastructures. The distribution information 240 may include information on the peripheral vehicles obtained through V2V communication.

The controller 170 also performs driving assist control based on the map information MAP and the driving environment information 200. Examples of the driving assist control may include autonomous driving control, path-following control, lane tracing assist control, collision avoidance control, and adaptive cruise control. For such driving assist control, the controller 170 performs vehicle travel control as necessary. The vehicle travel control includes steering control, acceleration control, and deceleration control. The controller 170 properly operates the travel device 160 (the steering unit, the drive unit, and the braking unit) to perform the steering control, the acceleration control, and the deceleration control. It can be said that the controller 170 and the travel device 160 constitute "vehicle travel controller" that performs vehicle travel control.

The case where the controller 170 performs autonomous driving control as an example of the driving assist control is considered. The controller 170 generates a travel plan of the vehicle 1 based on the map information MAP and the driving environment information 200. The travel plan includes a target route to a destination and local target tracks (a target track in a lane, a target track for a lane change). The travel plan also includes a vehicle travel control plan for following the target tracks and avoiding obstacles in conformity with traffic rules. The controller 170 performs vehicle travel control such that the vehicle 1 travels in accordance with the travel plan.

2-2. Configuration Example of Information Acquisition Device

The information acquisition device 20 acquires the driving environment information 200. As shown in FIG. 10, the peripheral condition sensor 110, the vehicle location sensor 120, the vehicle state sensor 130, the communication device 140, and the controller 170 constitute the information acquisition device 20.

Figure 12:
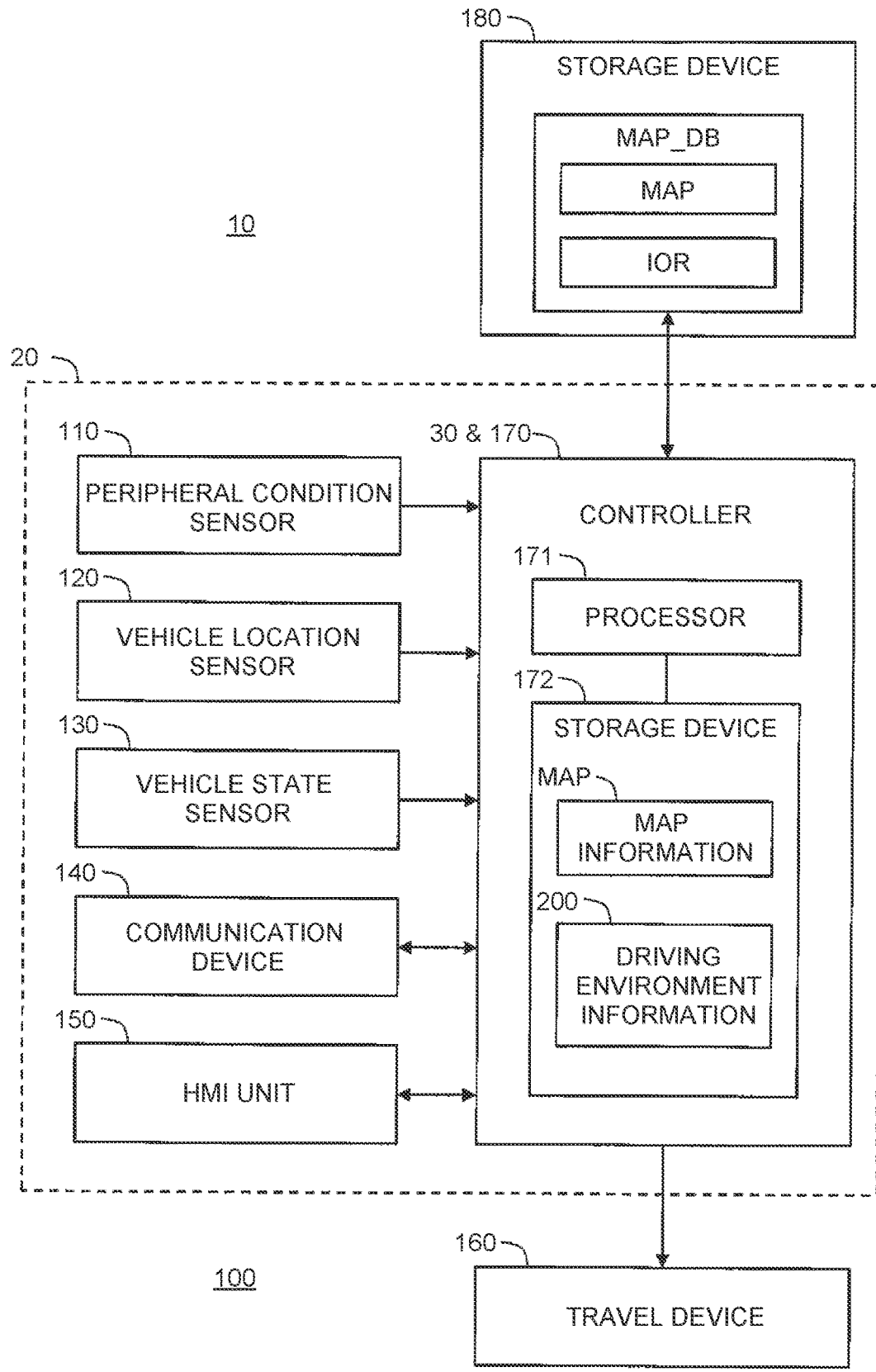
FIG. 12 is a block diagram showing a first configuration example of a database management device according to the embodiment of the present disclosure.

2-3. Configuration Example of Database Management Device 2-3-1. First Configuration Example FIG. 12 is a block diagram showing a first functional configuration example of the database management device 30. In the first configuration example, the map database MAP_DB is installed in the vehicle 1 (driving assist controller 100). More specifically, the map database MAP_DB is stored in a storage device 180. The storage device 180 may be the same as the storage device 172 of the controller 170. The controller 170 (processor 171) manages the map database MAP_DB based on the driving environment information 200. In short, the controller 170 functions as the database management device 30.

2-3-2. Second Configuration Example

Figure 13:
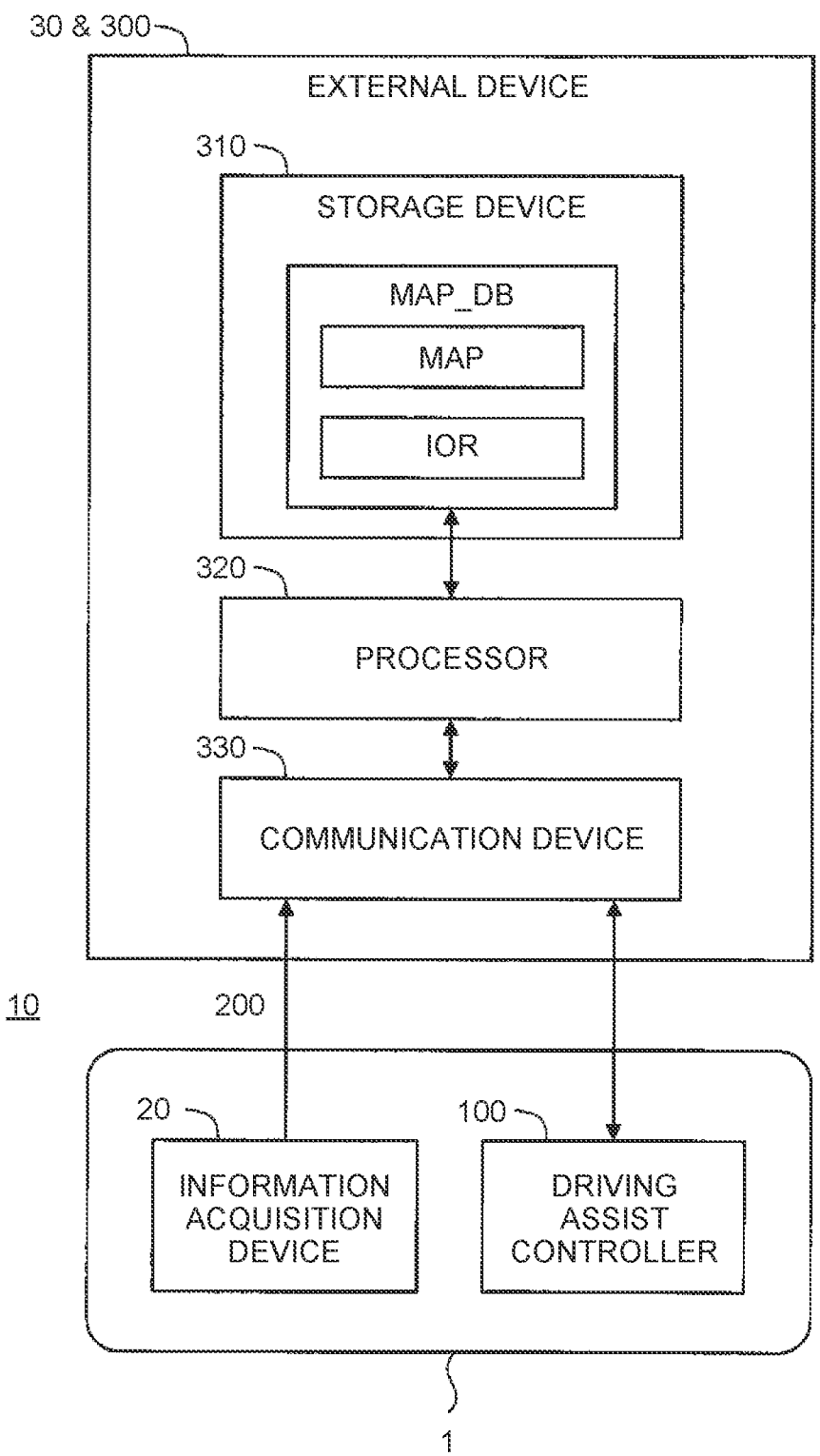
FIG. 13 is a block diagram showing a second configuration example of the database management device according to the embodiment of the present disclosure.

FIG. 13 is a block diagram showing a second configuration example of the database management device 30. In the second configuration example, the database management device 30 is implemented by an external device 300 outside the vehicle 1. The external device 300 is a management server, for example.

More specifically, the external device 300 includes a storage device 310, a processor 320, and a communication device 330. The storage device 310 stores the map database MAP_DB. The communication device 330 communicates with the communication device 140 on the vehicle 1 side. The processor 320 performs various information processes by executing computer programs stored in the storage device 310.

The information acquisition device 20 (controller 170) of the vehicle 1 transmits the driving environment information 200 to the external device 300 via the communication device 140. The processor 320 of the external device 300 receives the driving environment information 200 from the information acquisition device 20 via the communication device 330. The processor 320 manages the map database MAP_DB based on the driving environment information 200.

The driving assist controller 100 (controller 170) of the vehicle 1 requests map information MAP necessary for the external device 300 via the communication device 140. The processor 320 of the external device 300 reads the necessary map information MAP from the map database MAP_DB. The processor 320 then provides the map information MAP to the driving assist controller 100 via the communication device 330.

2-3-3. Third Configuration Example

Figure 14:
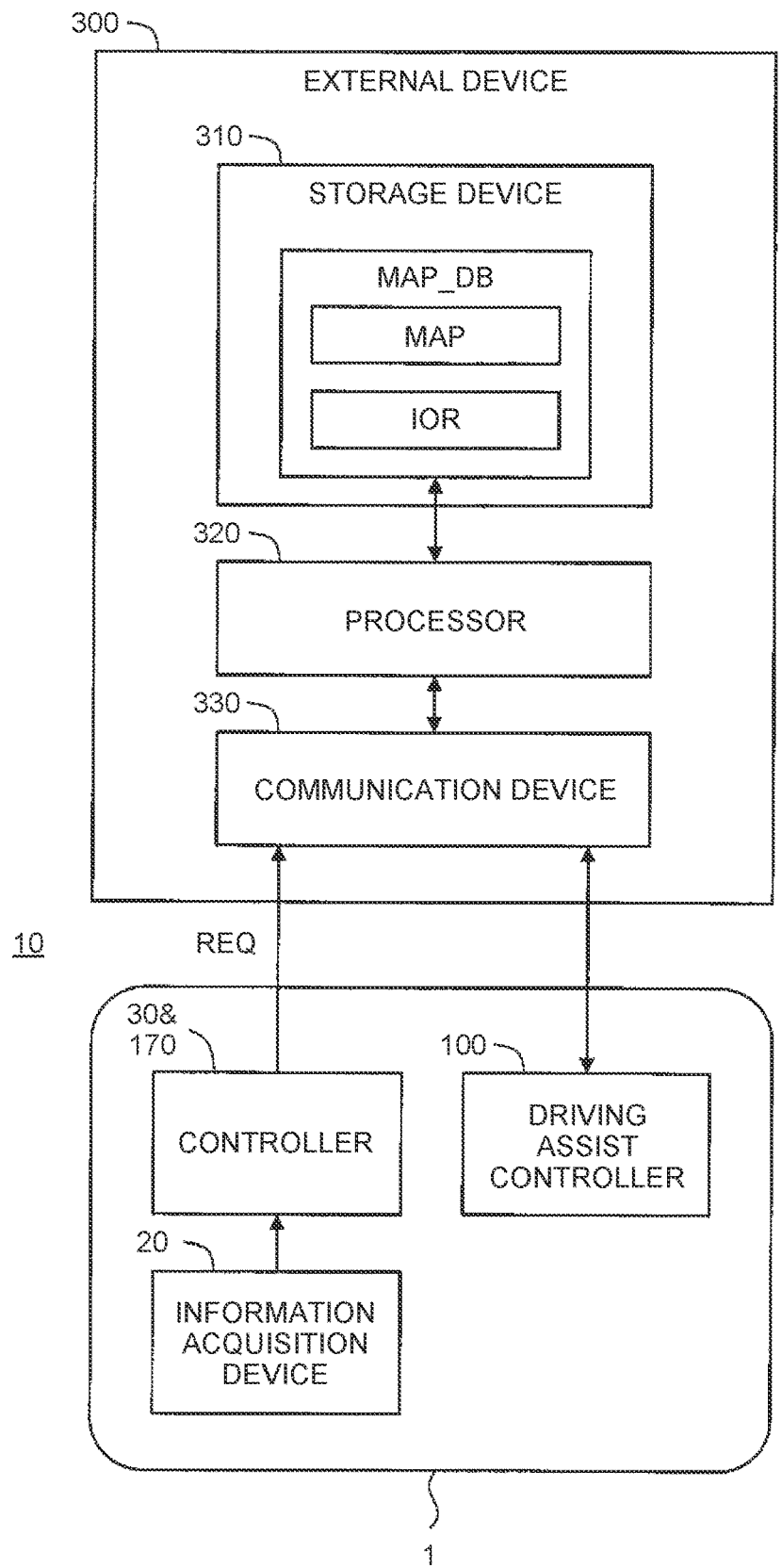
FIG. 14 is a block diagram showing a third configuration example of the database management device according to the embodiment of the present disclosure.

FIG. 14 is a block diagram showing a third configuration example of the database management device 30. In the third configuration example, the map database MAP_DB is stored in the external device 300 as in the case of the second configuration example. The database management device 30 is implemented by the controller 170 of the vehicle 1. In short, the controller 170 (processor 171) remotely operates the map database MAP_DB on the side of the external device 300.

Specifically, the controller 170 acquires the driving environment information 200 from the information acquisition device 20. The controller 170 then registers or updates the map database MAP_DB based on the driving environment information 200. At the time, the controller 170 transmits a request signal REQ for requesting registration or update to the external device 300 via the communication device 140. The request signal REQ contains information necessary for registration or update. The processor 320 of the external device 300 receives the request signal REQ via the communication device 330. The processor 320 then performs registration or update of the map database MAP_DB in response to the request signal REQ.

2-3-4. Fourth Configuration Example

The function of the database management device 30 may be distributed to the controller 170 (processor 171) of the vehicle 1 and the processor 320 of the external device 300.

The first to fourth configuration examples described above can also be summarized as shown below. More specifically, one processor (the processor 171 or the processor 320) or two or more processors (the processor 171 and the processor 320) execute processes as the database management device 30.

2-4. Configuration Example of Driving Assist Level Determination Device

2-4-1. First Configuration Example

Figure 15:
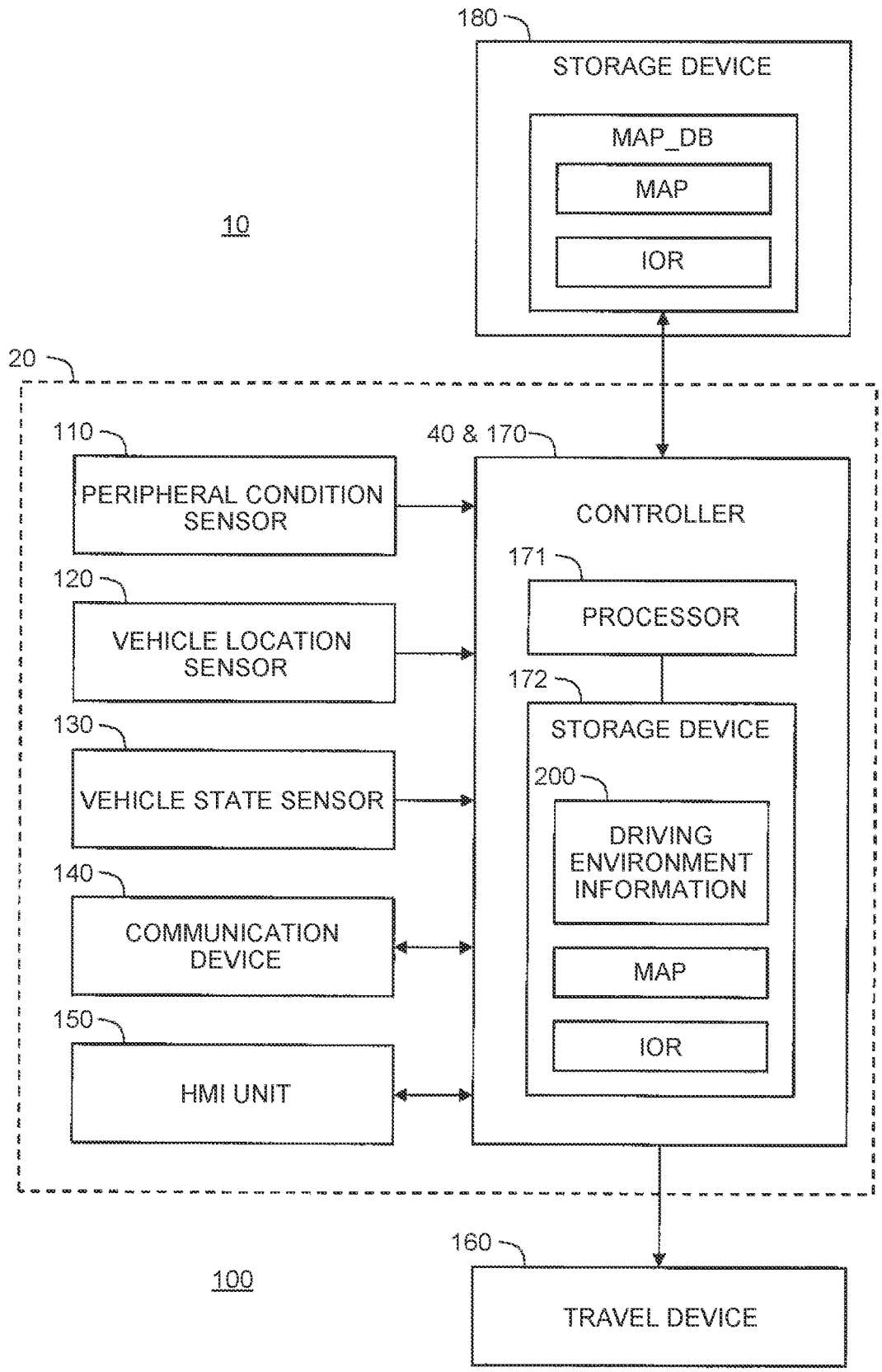
FIG. 15 is a block diagram showing a first configuration example of the driving assist level determination device according to the embodiment of the present disclosure.

FIG. 15 is a block diagram showing a first configuration example of the driving assist level determination device 40. In the first configuration example, the map database MAP_DB is installed in the vehicle 1 (driving assist controller 100). More specifically, the map database MAP_DB is stored in a storage device 180. The storage device 180 may be the same as the storage device 172 of the controller 170. The controller 170 (processor 171) functions as the driving assist level determination device 40.

Specifically, the controller 170 determines a target range where the vehicle 1 travels, before or during execution of the driving assist control. The controller 170 also acquires map information MAP relating to the target range from the storage device 180 (map database MAP_DB). The controller 170 further acquires the intervention operation information IOR from the driving environment information 200 or the storage device 180 (map database MAP_DB). The controller 170 then determines the allowable level ALV within the target range. Then, the controller 170 performs the driving assist control of the determined allowable level ALV.

2-4-2. Second Configuration Example

Figure 16:
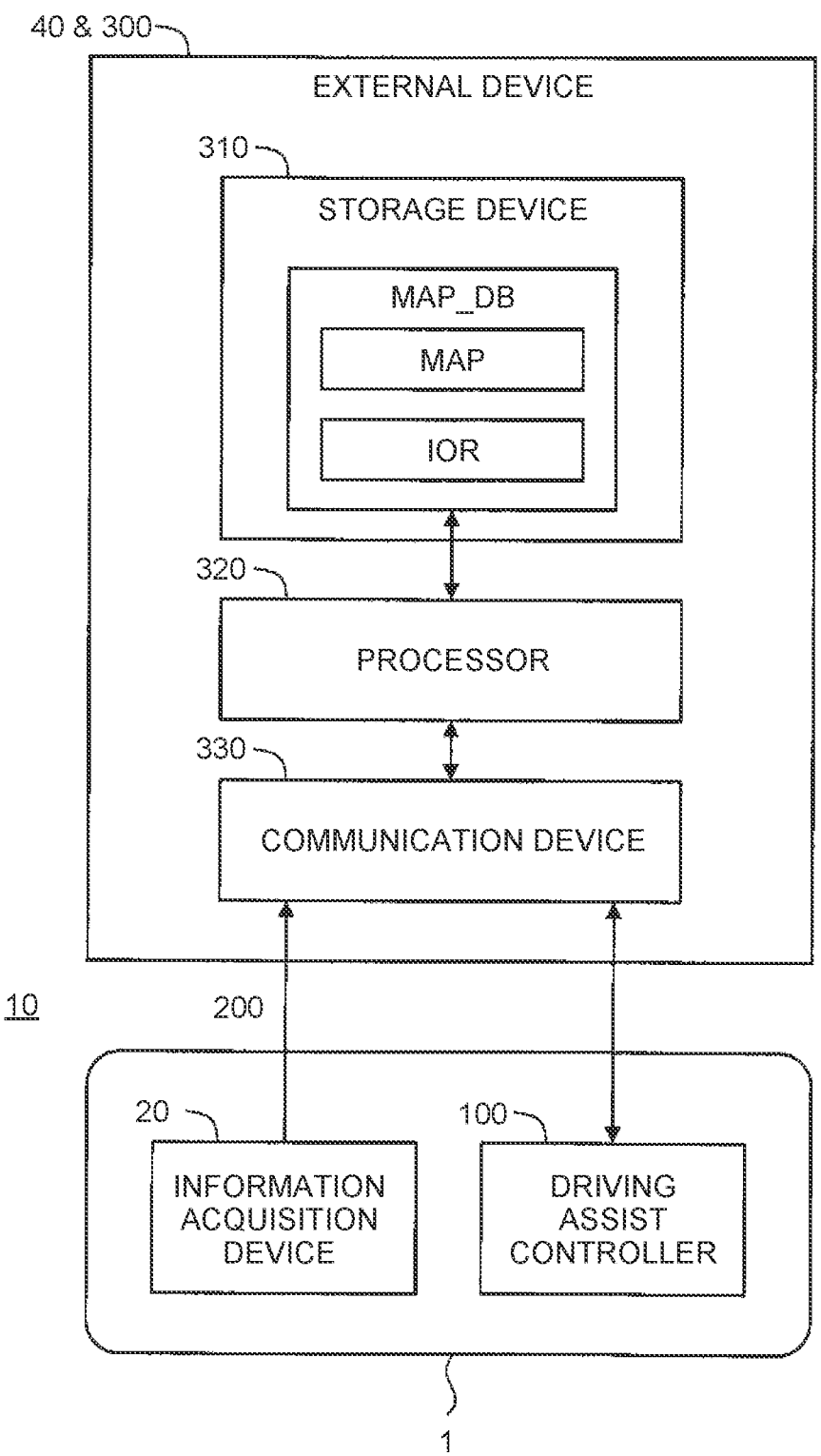
FIG. 16 is a block diagram showing a second configuration example of the driving assist level determination device according to the embodiment of the present disclosure.

FIG. 16 is a block diagram showing a second configuration example of the driving assist level determination device 40. In the second configuration example, the driving assist level determination device 40 is implemented by the external device 300 outside the vehicle 1. The configuration of the external device 300 is the same as the configuration shown in FIG. 13 described before.

The driving assist controller 100 (controller 170) of the vehicle 1 determines a target range where the vehicle 1 travels, before or during execution of the driving assist control. The driving assist controller 100 transmits the information on the target range to the external device 300 via the communication device 140. The processor 320 of the external device 300 receives the information on the target range via the communication device 330. Alternatively, the processor 320 of the external device 300 may determine the target range.

The processor 320 of the external device 300 acquires the map information MAP relating to the target range from the storage device 310 (map database MAP_DB). The processor 320 also acquires the intervention operation information IOR from the driving environment information 200 or the storage device 310 (map database MAP_DB). The processor 320 then determines the allowable level ALV within the target range. The processor 320 notifies the information on the determined allowable level ALV to the driving assist controller 100 via the communication device 330.

The driving assist controller 100 receives the information on the determined allowable level ALV via the communication device 140. The driving assist controller 100 performs the driving assist control of the notified allowable level ALV.

2-4-3. Third Configuration Example

Figure 17:
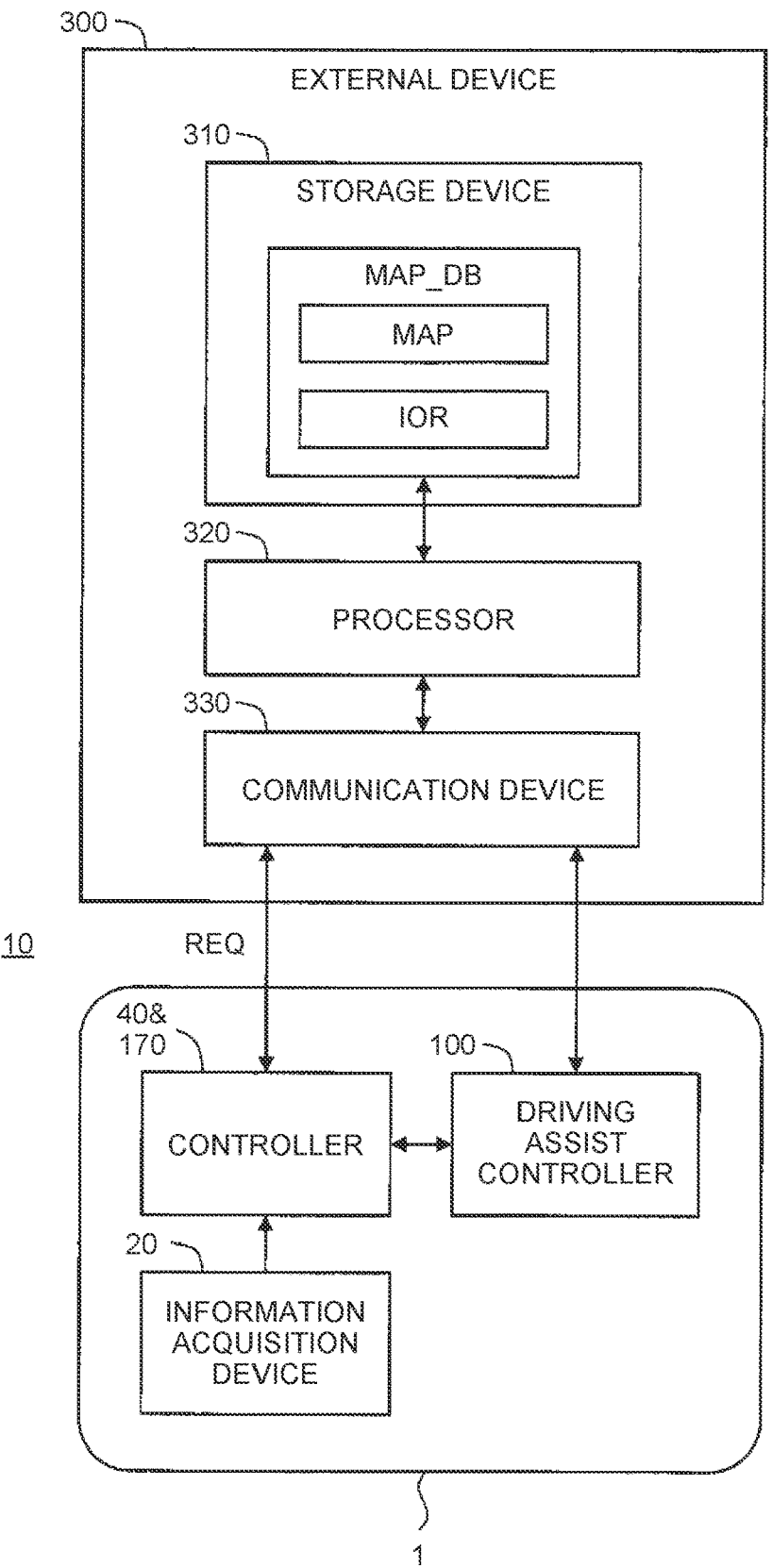
FIG. 17 is a block diagram showing a third configuration example of the driving assist level determination device according to the embodiment of the present disclosure.

FIG. 17 is a block diagram showing a third configuration example of the driving assist level determination device 40. In the third configuration example, the map database MAP_DB is stored in the external device 300 as in the case of the second configuration example. The driving assist level determination device 40 is implemented by the controller 170 of the vehicle 1.

Specifically, the controller 170 determines a target range where the vehicle 1 travels, before or during execution of the driving assist control. The controller 170 transmits a request signal REQ for requesting provision of the map information MAP relating to the target range to the external device 300 via the communication device 140. The request signal REQ may further request provision of the intervention operation information IOR.

The processor 320 of the external device 300 receives the request signal REQ via the communication device 330. The processor 320 reads from the storage device 310 the request information requested in the request signal REQ. The processor 320 then transmits the request information to the controller 170 via the communication device 330.

The controller 170 acquires the request information from the external device 300 via the communication device 140. The controller 170 may acquire the intervention operation information IOR from the driving environment information 200. The controller 170 then determines the allowable level ALV within the target range. Then, the driving assist controller 100 performs the driving assist control of the determined allowable level ALV.

2-4-4. Fourth Configuration Example

The function of the driving assist level determination device 40 may be distributed to the controller 170 (processor 171) of the vehicle 1 and the processor 320 of the external device 300.

The first to fourth configuration examples described above can also be summarized as shown below. More specifically, one processor (the processor 171 or the processor 320) or two or more processors (the processor 171 and the processor 320) execute processes as the driving assist level determination device 40.

3. Registration of Intervention Operation Information

Figure 18:
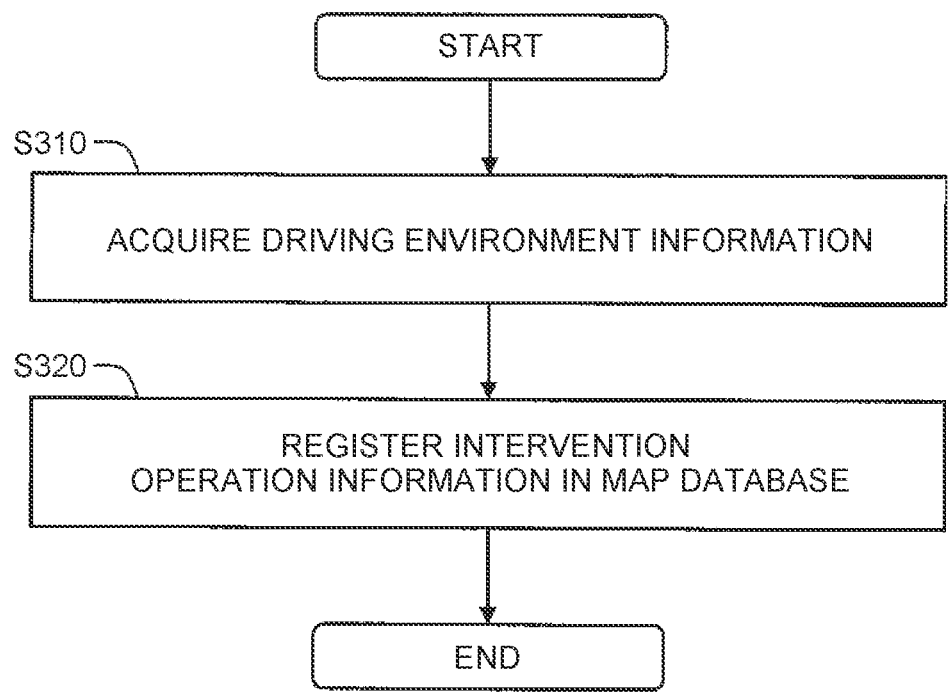
FIG. 18 is a flowchart showing registration of intervention operation information by the database management device according to the embodiment of the present disclosure.

FIG. 18 is a flowchart showing registration of the intervention operation information IOR by the database management device 30 according to the present embodiment. The database management device 30 acquires the driving environment information 200 from the information acquisition device 20, during execution or after completion of the driving assist control (step S310).

The driving environment information 200 includes the vehicle state information 230. The vehicle state information 230 includes information indicating that the intervention operation is performed by the driver. The database management device 30 acquires, based on the vehicle state information 230, the location where the intervention operation is performed as an intervention operation location. The database management device 30 registers in the map database MAP_DB the intervention operation information IOR indicating the intervention operation location (step S320).

4. Determination of Allowable Level of Driving Assist Control

Description is now given of the determination method of the allowable level ALV of the driving assist control by the driving assist level determination device 40. Various examples are conceivable as the determination method of the allowable level ALV.

4-1. First Example

Figure 19:
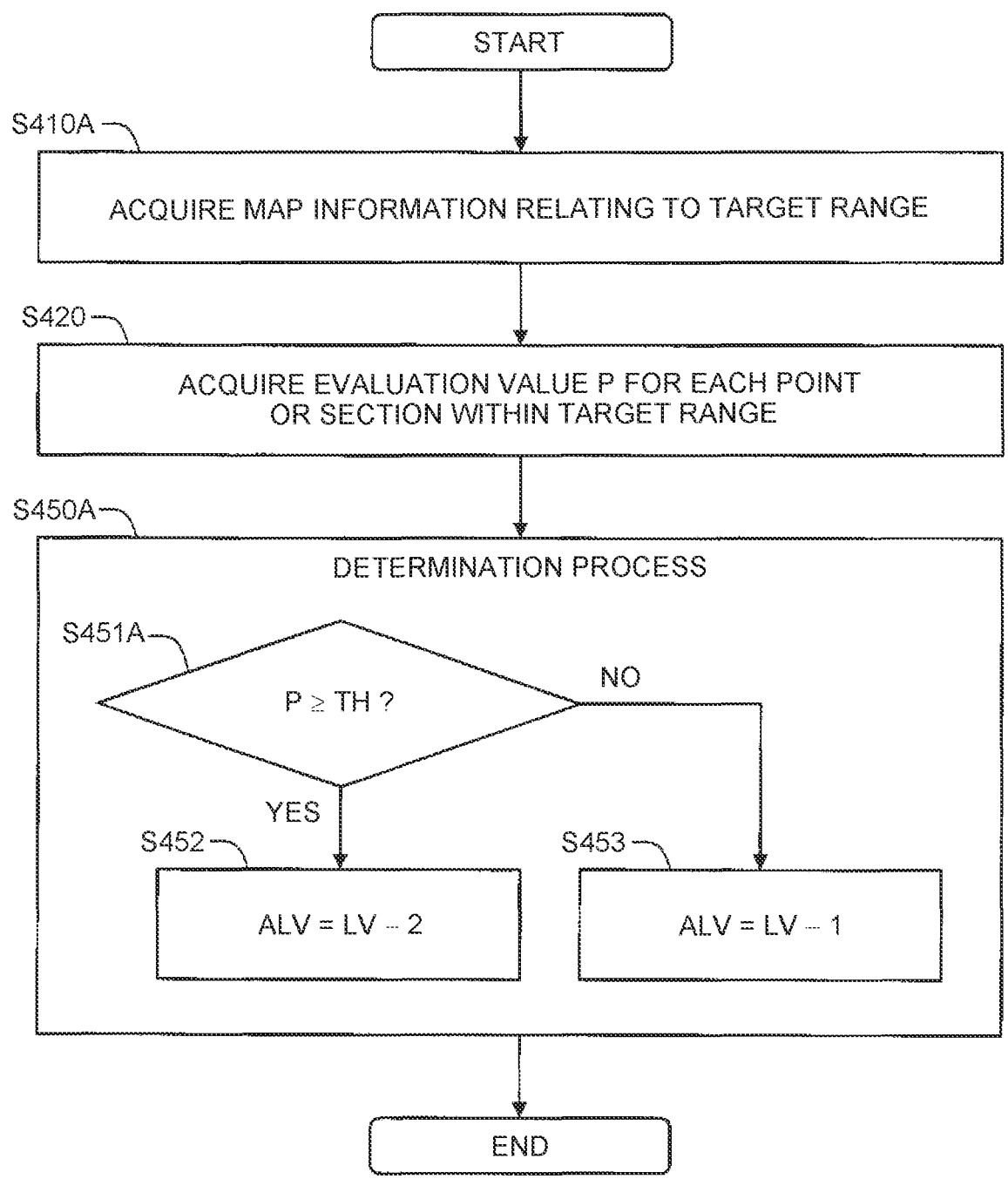
FIG. 19 is a flowchart showing a first example of the determination method of the allowable level of the driving assist control according to the embodiment of the present disclosure.

FIG. 19 is a flowchart showing a first example of the determination method of the allowable level ALV. The first example corresponds to the examples shown in FIGS. 5 and 6 described before.

In step S410A, the driving assist level determination device 40 acquires map information MAP relating to a target range from the map database MAP_DB.

In step S420, the driving assist level determination device 40 acquires an evaluation value P for each point or section within the target range, based on the map information MAP. In the case of acquiring the evaluation value P for each section, an average of the evaluation values P in the respective points included in a section is calculated as the evaluation value P of the section, for example.

In subsequent step S450A, the driving assist level determination device 40 performs a following determination process for each point or section within the target range. The driving assist level determination device 40 compares the evaluation value P with the threshold TH (step S451A). When the evaluation value P is equal to or more than the threshold TH (step S451A; Yes), the driving assist level determination device 40 sets the allowable level ALV to the second level LV-2 that is higher than the first level LV-1 (step S452). When the evaluation value P is less than the threshold TH (step S451A; No), the driving assist level determination device 40 sets the allowable level ALV to the first level LV-1 (step S453).

4-2. Second Example

Figure 20:
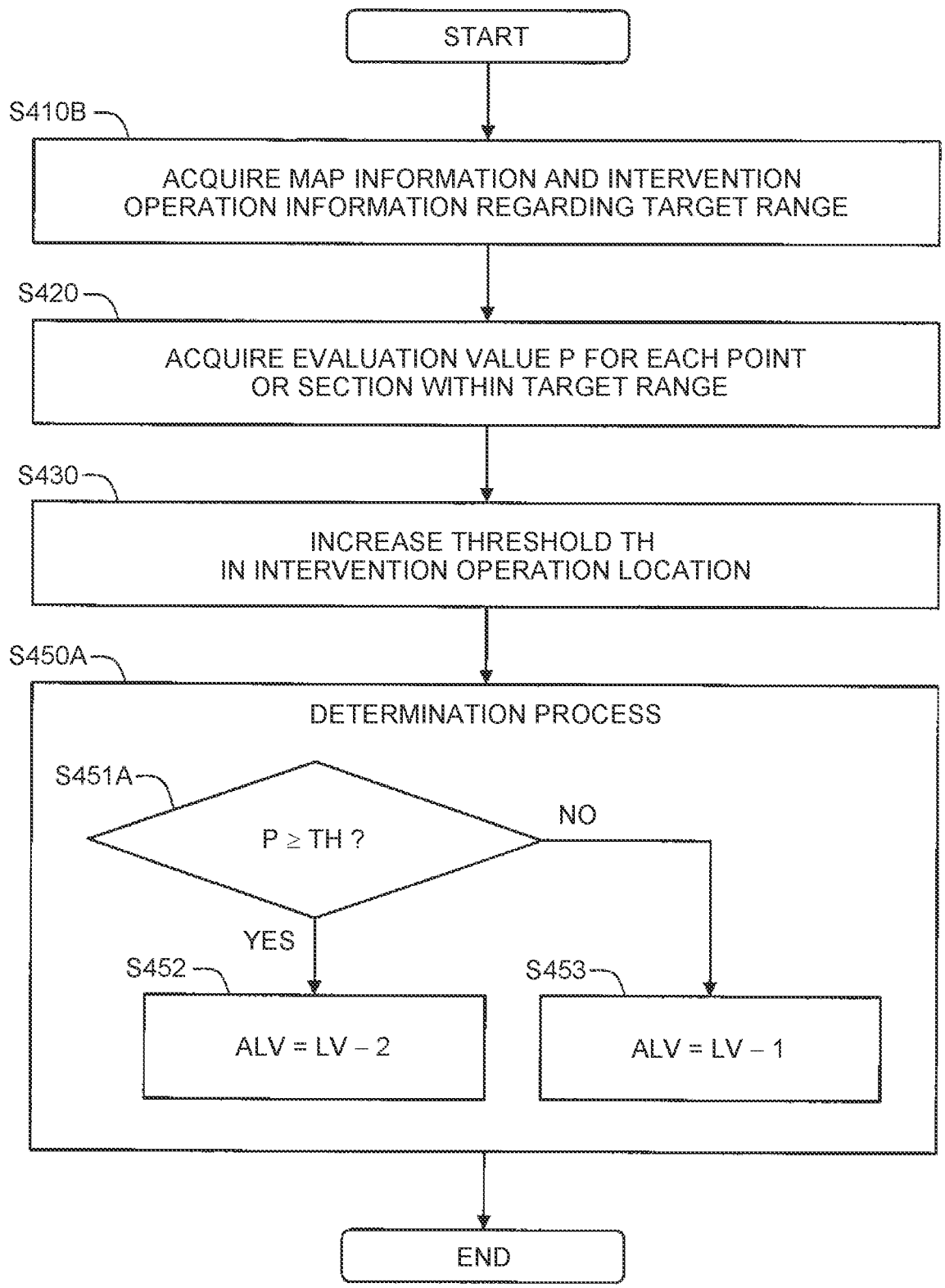
FIG. 20 is a flowchart showing a second example of the determination method of the allowable level of the driving assist control according to the embodiment of the present disclosure.

FIG. 20 is a flowchart showing a second example of the determination method of the allowable level ALV. The second example corresponds to the example shown in FIG. 8 described before. The description overlapped with the description of the first example is properly omitted.

In step S410B, the driving assist level determination device 40 acquires map information MAP relating to a target range from the map database MAP_DB. The driving assist level determination device 40 also acquires intervention operation information IOR from the driving environment information 200 or the map database MAP_DB. Step S420 is the same as step S420 in the first example.

In step S430, the driving assist level determination device 40 increases the threshold TH in an intervention operation location so as to be larger than the threshold TH in a normal location that is not the intervention operation location.

Step S450A is the same as step S450A in the first example. However, the thresholds TH in the intervention operation location and the normal location are different. As a result, on condition that the evaluation values P in the intervention operation location and the normal location are identical, the allowable level ALV in the intervention operation location is equal to or less than the allowable level ALV in the normal location.

4-3. Third Example

Figure 21:
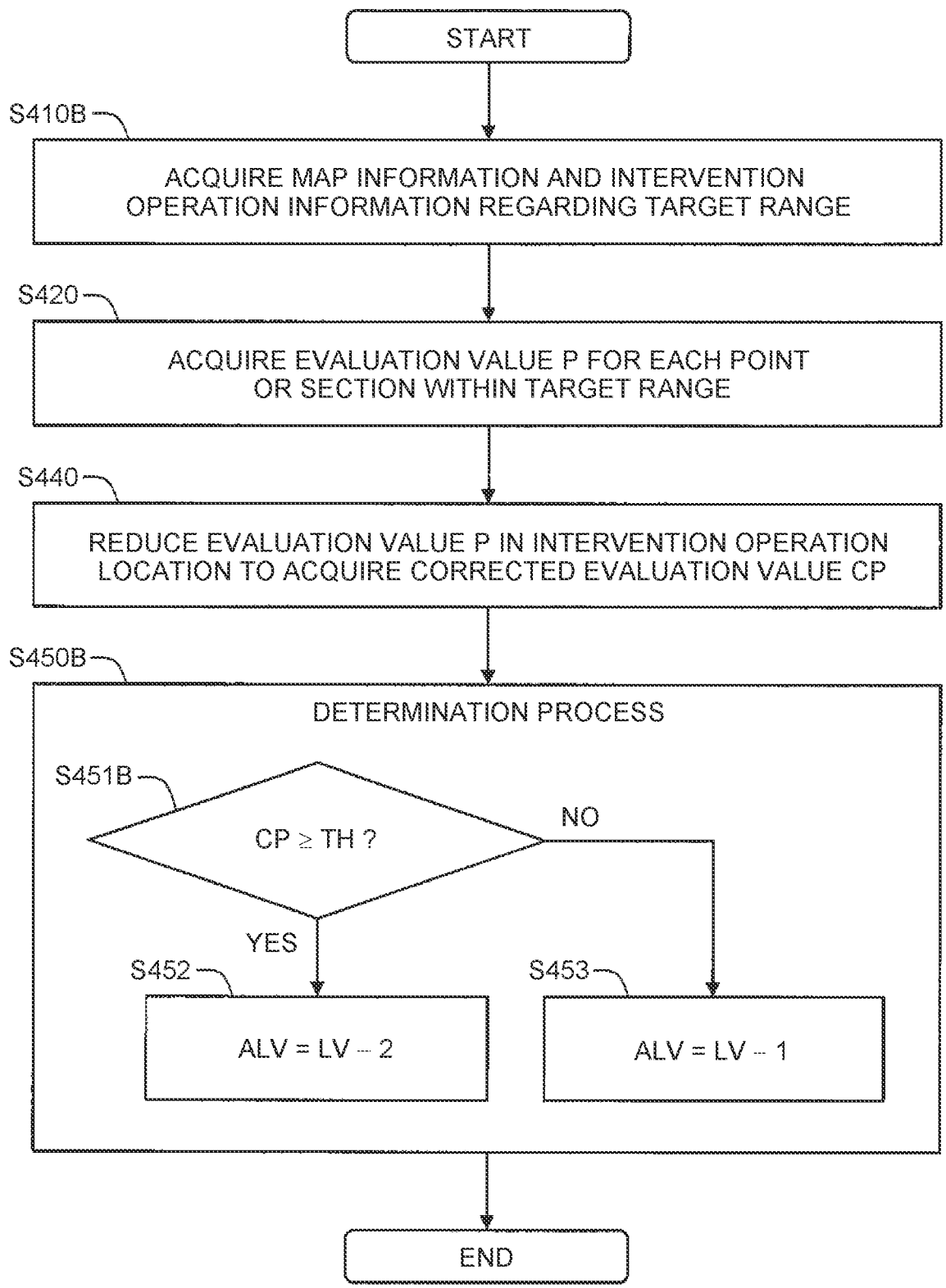
FIG. 21 is a flowchart showing a third example of the determination method of the allowable level of the driving assist control according to the embodiment of the present disclosure.

FIG. 21 is a flowchart showing a third example of the determination method of the allowable level ALV. The third example corresponds to the example shown in FIG. 9 described before. The description overlapped with the description of the first and second examples is properly omitted.

Step S410B and step S420 are the same as those in the second example. In step S440 subsequent to step S420, the driving assist level determination device 40 corrects the evaluation value P to acquire a corrected evaluation value CP. Specifically, the driving assist level determination device 40 acquires the corrected evaluation value CP by reducing the evaluation value P in the intervention operation location. Meanwhile, the driving assist level determination device 40 maintains the evaluation value P in the normal location as it is, and uses it as the corrected evaluation value CP.

In subsequent step S450B, the driving assist level determination device 40 performs a following determination process for each point or section within the target range. Specifically, the driving assist level determination device 40 compares the corrected evaluation value CP with the threshold TH (step S451B). When the corrected evaluation value CP is equal to or more than the threshold TH (step S451B; Yes), the driving assist level determination device 40 sets the allowable level ALV to the second level LV-2 that is higher than the first level LV-1 (step S452). When the corrected evaluation value CP is less than the threshold TH (step S451B; No), the driving assist level determination device 40 sets the allowable level ALV to the first level LV-1 (step S453).

4-4. Fourth Example

Figure 22:
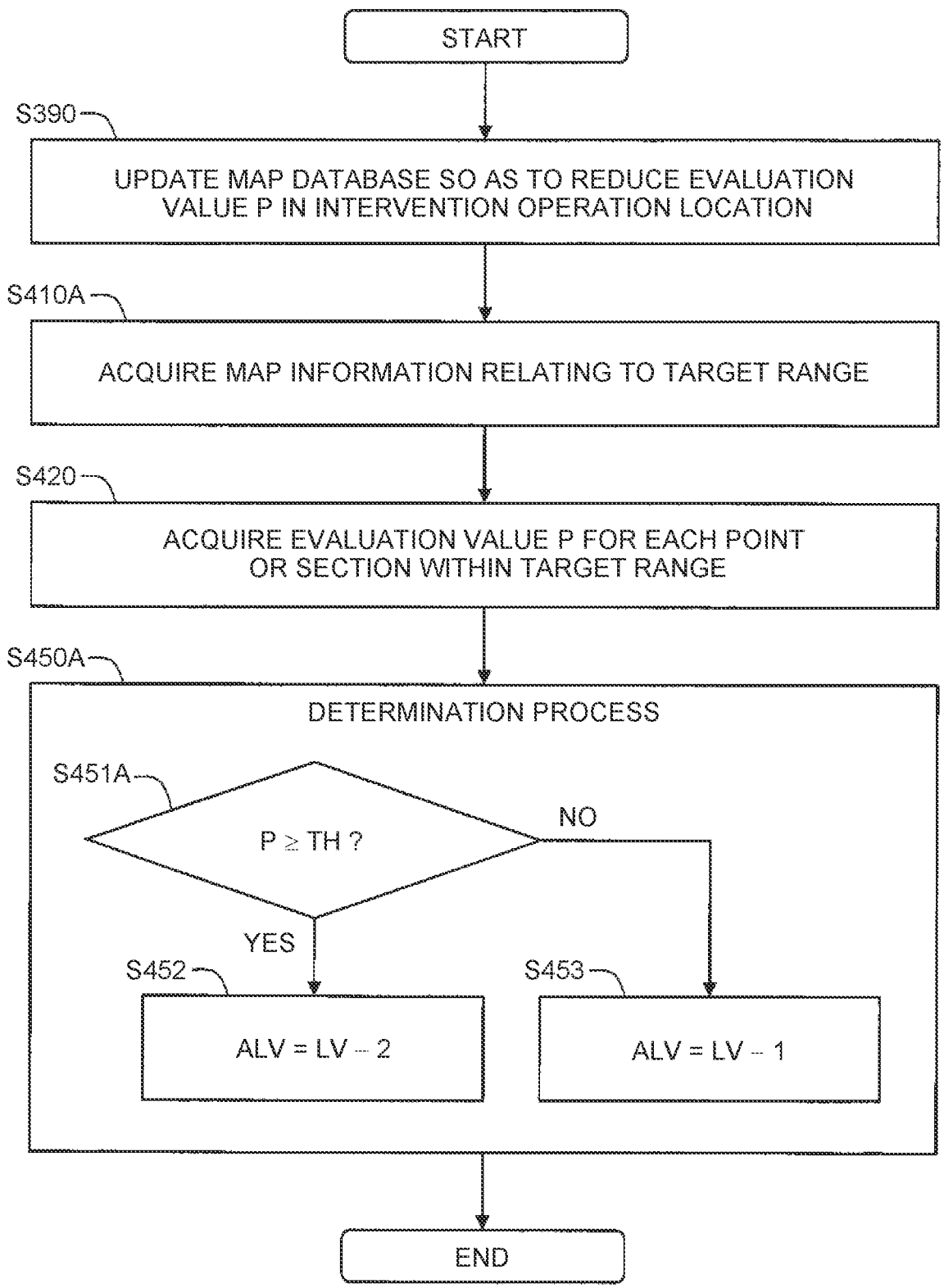
FIG. 22 is a flowchart showing a fourth example of the determination method of the allowable level of the driving assist control according to the embodiment of the present disclosure.

FIG. 22 is a flowchart showing a fourth example of the determination method of the allowable level ALV. The description overlapped with the description of the first example is properly omitted.

In step S390, the database management device 30 may update, based on the intervention operation information IOR, the map database MAP_DB (map information MAP) so as to reduce the evaluation value P in the intervention operation location. Then, the same process as the first example is performed.

4-5. Fifth Example

A combination of a plurality of types of map information MAP may be used for the driving assist control. In that case, the evaluation values P for the respective types of the map information MAP are used, and two or more allowable levels ALV are obtained for the same point or section. Setting of the threshold TH may be different among the respective types of the map information MAP. The driving assist level determination device 40 combines the allowable levels ALV to determine a final allowable level ALV. For example, the driving assist level determination device 40 selects the lowest allowable level ALV among the allowable levels ALV.

5. Various Examples of Map Information

Figure 23:
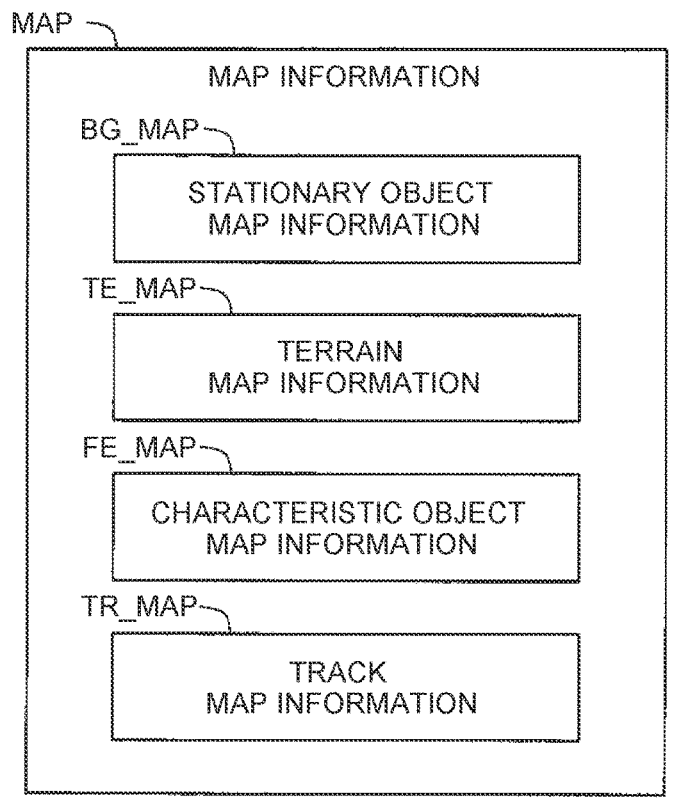
FIG. 23 is a block diagram showing various examples of map information in the embodiment of the present disclosure.

Description is now given of various examples of the map information MAP according to the present embodiment. The map information MAP includes map information in various perspectives, in addition to general road maps or navigation maps. In the example shown in FIG. 23, the map information MAP includes stationary object map information BG_MAP, terrain map information TE_MAP, characteristic object map information FE_MAP, and track map information TR_MAP. Hereinafter, each of the map information MAP will be described in detail.

5-1. Stationary Object Map Information BG_MAP

Figure 24:
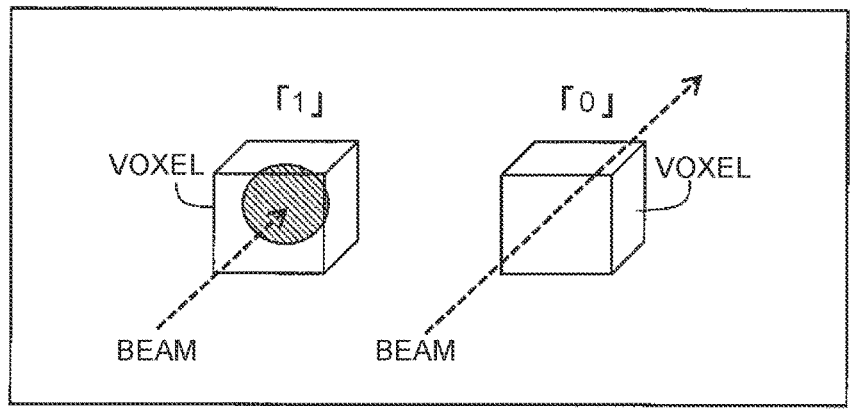
FIG. 24 is a conceptual view for describing an example of stationary object map information in the embodiment of the present disclosure.

FIG. 24 is a conceptual view for describing an example of the stationary object map information BG_MAP. The stationary object map information BG_MAP is map information MAP relating to stationary objects. The stationary object map information BG_MAP indicates the location of stationary objects. The stationary objects are immovable road structures, such as walls and guardrails. The stationary objects can also be referred to as a background.

In the example shown in FIG. 24, the space around the vehicle 1 is divided into a large number of voxels VX. For each voxel VX, one data set is prepared. Each data set includes a location [X, Y, Z], an occupancy R, an evaluation value P, and evaluation information regarding the voxel VX.

First, the occupancy R will be described. In one example, a LIDAR included in the peripheral condition sensor 110 is used for detection of a stationary object. The LIDAR sequentially outputs (scans) a laser beam toward a plurality of directions. Based on reflective conditions of the laser beam, the distance and the direction of reflecting points can be calculated. A LIDAR point group is a group of measure points (reflection points) measured by the LIDAR.

When at least one laser beam reflects upon a certain voxel VX, a measurement result value $M_i$ relating to the voxel VX is set to "1". When all the laser beams incident on a certain voxel VX pass through the voxel VX without being reflected thereon, the measurement result value $M_i$, relating to the voxel VX is set to "0." The measurement result value $M_i$="1" signifies that any object is present in the voxel VX. The measurement result value $M_i$="0" signifies that no object is present in the voxel VX.

The LIDAR performs temporally repeated scanning with a laser beam. Therefore, measurement result values $M_i$ that are temporally continuous are obtained with respect to the same voxel VX. The occupancy R relating to the voxel VX is defined as an average of the measurement result values $M_i$. When the number of times of measurement is N, the occupancy R relating to the voxel VX is expressed by expression (1) below:

$$R = \frac{1}{N} \sum^{N} M_i \qquad (1)$$

Whenever the vehicle 1 travels on the same road, the measurement result values $M_i$ relating to the voxel VX are newly obtained, and the occupancy R is calculated again. In other words, the occupancy R is updated.

The evaluation value P indicates "certainty" of the stationary object map information BG_MAP. In short, the evaluation value P indicates the certainty of the presence or absence of a stationary object in the location [X, Y, Z]. For example, the evaluation value P takes a value in the range of 0 to 1. As the evaluation value P is higher, there is a higher possibility that the stationary object is present or absent in the location [X, Y, Z].

The evaluation information is used to calculate the evaluation value P. For example, the evaluation information includes the number of times of measurement N. When the number of times of measurement N is small, the evaluation value P is low. As the number of times of measurement N becomes larger, the evaluation value P becomes higher.

The evaluation information may include a variance V. The variance V is a variance in position of the measure points (reflection points) included in a voxel VX. For example, when the surface of a wall is present in a voxel VX, a laser beam is reflected on the surface of the wall, so that distribution of the measure points becomes two-dimensional. In this case, the variance V is relatively small. When an indeterminate objects such as grass and smoke, are present in the voxel VX, the distribution of the measure points becomes three-dimensional, so that the variance V becomes large. As the variance V becomes larger, the evaluation value P becomes lower.

The evaluation information may include the aforementioned occupancy R. The occupancy value R="1" signifies that any object is constantly present in a voxel VX. The object that is constantly present has a high possibility of being a stationary object. Therefore, it may be considered to set the evaluation value P to be higher as the occupancy R becomes higher.

The database management device 30 generates and updates the stationary object map information BG_MAP based on the driving environment information 200. Specifically, the driving environment information 200 includes the peripheral condition information 210 (LIDAR measurement information) and the vehicle location information 220. The database management device 30 converts the peripheral condition information 210 into an absolute coordinate system, based on the location and direction of the vehicle 1 indicated by the vehicle location information 220. The database management device 30 then generates or updates the data set relating to each voxel VX, based on the peripheral condition information 210 converted into the absolute coordinate system.

The information "there is a high possibility of the presence of a stationary object" is useful. For example, such information is used to remove the stationary object from the LIDAR point group and to detect non-stationary objects, such as pedestrians. The information "there is a high possibility of the absence of any stationary object" is also useful. This is because when a target is detected in a free space where no stationary object is present, the detected target can be defined as a non-stationary object. Thus, the stationary object map information BG_MAP may be used for recognition of a non-stationary object, for example. When the non-stationary object is recognized, the driving assist control for avoiding the non-stationary object can be performed.

5-2. Terrain Map Information TE_MAP

FIG. 25 is a conceptual view for describing one example of the terrain map information TE_MAP. The terrain map information TE_MAP is map information MAP relating to terrains. The terrain map information TE_MAP indicates a height (altitude) Z of a road surface at a location [X, Y].

In the example shown in FIG. 25, a region around the vehicle 1 is divided into a large number of cells. For each cell, one data set is prepared. Each data set includes a position [X, Y], a height Z, an evaluation value P, and evaluation information regarding the cell.

The LIDAR included in the peripheral condition sensor 110 is used for calculation of the height Z of a road surface, for example. Specifically, a road surface point group indicative of the road surface is extracted from LIDAR point groups. Furthermore, the road surface point group included in each cell is extracted. The height Z of the road surface at the location [X, Y] is calculated by interpolating the heights of the road surface points in the extracted road surface point group. For example, an average of the heights of the road surface points in the extracted road surface point group is calculated as a height Z. The number of road surface points used for calculation of the height Z and the variance of the respective heights may be used as the evaluation information described later.

Whenever the vehicle 1 travels on the same road, the same road surface is repeatedly measured (detected), and the height Z of the same road surface is repeatedly calculated. In this case, an average or a weighted average of the heights Z calculated so far is used as the height Z. In short, whenever the same road surface is measured, the height Z is updated. In the case of the weighted average value, the weight applied to the latest height Z is set to be largest, for example.

The evaluation value P indicates "certainty" of the terrain map information TE_MAP. In short, the evaluation value P indicates certainty of the presence of a road surface at the location [X, Y] and the height Z indicated by the terrain map information TE_MAP. For example, the evaluation value P takes a value in the range of 0 to 1.

The evaluation information includes the number of times of measurement, and the variance. The number of times of measurement includes at least one of the number of times of calculation of the height Z and the number of road surface points used for calculation of the height Z. The variance includes at least one of the variance of the calculated heights Z and the variance in height of the respective road surface points used for calculation of the height Z. For example, when the number of times of measurement is small, the evaluation value P is low. As the number of times of measurement becomes larger, the evaluation value P becomes higher. As the variance becomes larger, the evaluation value P becomes lower. In another example, the evaluation value P may become lower, as a difference between the height Z and a height Z' of an adjacent position becomes larger.

The database management device 30 generates and updates the terrain map information TE_MAP based on the driving environment information 200. Specifically, the driving environment information 200 includes the peripheral condition information 210 (LIDAR measurement information) and the vehicle location information 220. The database management device 30 converts the peripheral condition information 210 into an absolute coordinate system, based on the location and direction of the vehicle 1 indicated by the vehicle location information 220. The database management device 30 then generates or updates the data set relating to each cell, based on the peripheral condition information 210 converted into the absolute coordinate system.

The terrain map information TE_MAP is used as shown below. For example, with the terrain map information TE_MAP, it is possible to remove the road surface from the LIDAR point groups, and to detect obstacles (for example, falling objects) on the road surface. In another example, with the terrain map information TE_MAP, it is possible to calculate a road surface gradient from the information on the height Z, and to plan a vehicle travel control, such as acceleration and deceleration, based on the road surface gradient. In still another example, it is possible to distinguish a travel area where the vehicle 1 can travel. In yet another example, it is possible to find out a retreat area used to retreat the vehicle 1 in the case of the driving assist level LV-E (human-off) illustrated in FIG. 2.

5-3. Characteristic Object Map Information FE_MAP

FIG. 26 is a conceptual view for describing one example of the characteristic object map information FE_MAP. The characteristic object map information FE_MAP is map information MAP relating to characteristic objects. The characteristic object map information FE_MAP indicates the location of characteristic objects. Examples of the characteristic objects may include linear objects, such as a lane marking and a curbstone, sheet objects, such as an indicator and a signboard, and pillar objects, such as a pole and a telegraph pole.

As one example, characteristic object map information FE_MAP relating to a lane marking LM is considered. The location of the lane marking LM is expressed by locations [Xs, Ys, Zs] and [Xe, Ye, Ze] on both the ends of the lane marking LM. At least one of the camera and the LIDAR included in the peripheral condition sensor 110 is used for calculation of the location of the lane marking LM, for example. Specifically, a road surface image indicative of a road surface is generated from camera imaging information or LIDAR measurement information. Next, a binarization process or an edge detection process is performed to extract a lane marking LM from the road surface image. Then, the location of the lane marking LM is calculated based on the camera imaging information or the LIDAR measurement information.

Whenever the vehicle 1 travels on the same road, the same lane marking LM is repeatedly measured (detected), and the same lane marking LM is repeatedly calculated. In this case, an average or a weighted average of the locations calculated so far is used as the location. In short, whenever the same lane marking LM is measured, the location thereof is updated. In the case of the weighted average value, the weight applied to the latest location is set to be largest, for example. Whether the lane marking LM measured this time and a known lane marking LM are identical or not is determined based on whether the lane marking LM measured this time is included in a prescribed range around the known lane marking LM.

For each lane marking LM, one data set is prepared. In the example indicated in FIG. 26, the data set includes the location of the lane marking LM, the evaluation value P, and evaluation information. The same configuration applies to the sheet objects or the pillar objects. When the characteristic object is a sheet object, the data set may include a center position, a width, a height, and a direction of the sheet object. When the characteristic object is a pillar object, the data set may include an axial center position, a height, and a radius of the pillar object.

The evaluation value P indicates "certainty" of the characteristic object map information FE_MAP. In short, the evaluation value P indicates the certainty of the presence of a characteristic object in the location indicated by characteristic object map information FE_MAP. For example, the evaluation value P takes a value in the range of 0 to 1.

The evaluation information includes the number of times of measurement, and variance in calculated location. For example, when the number of times of measurement is small, the evaluation value P is low. As the number of times of measurement becomes larger, the evaluation value P becomes higher. As the variance in calculated location becomes larger, the evaluation value P becomes lower.

The database management device 30 generates and updates the characteristic object map information FE_MAP based on the driving environment information 200. Specifically, the driving environment information 200 includes the peripheral condition information 210 (camera imaging information, LIDAR measurement information) and the vehicle location information 220. The database management device 30 converts the peripheral condition information 210 into an absolute coordinate system, based on the location and direction of the vehicle 1 indicated by the vehicle location information 220. The database management device 30 then generates or updates the data set regarding the characteristic object, based on the peripheral condition information 210 converted into the absolute coordinate system.

Such characteristic object map information FE_MAP is used in "own-location estimation (localization)" for enhancing the accuracy of the vehicle location information 220, for example. In the own-location estimation, the location and direction of the vehicle 1 are estimated. Since the method of own-location estimation is well-known, the detailed description thereof is omitted. The driving assist control and generation and update of the map information MAP are performed based on the high-accuracy vehicle location information 220 obtained by own-location estimation.

As shown in FIG. 26, the evaluation information may include own-location estimation error. Hereinafter, description is given of a method for determining the evaluation value P of the characteristic object map information FE_MAP from the perspective of the own-location estimation error. Although description is given of the location of the vehicle 1 in the following example, the description also applies to the direction of the vehicle 1.

In the example shown in FIG. 27, characteristic objects $F_i$ (i=1 to 3) are present around the vehicle 1. The characteristic object $F_1$ is a lane marking, the characteristic object $F_2$ is a signboard, and the characteristic object $F_3$ is a pole. These characteristic objects $F_i$ are detected based on the peripheral condition information 210 (camera imaging information, LIDAR measurement information). Measured distances $d_i$ to the characteristic objects $F_i$ can also be obtained from the peripheral condition information 210. Here, a lateral distance is used as a measured distance $d_1$ to the lane marking, and a longitudinal direction distance is used as a measured distance $d_2$ to the signboard. The measured distances $d_i$ are assumed to have a prescribed measurement error $\sigma_1$.

The locations of the characteristic objects $F_i$ are already registered in the characteristic object map information FE_MAP. Own-location estimation is performed based on the locations and the measured distances $d_i$ of the characteristic objects $F_i$ registered in the characteristic object map information FE_MAP.

Figure 28:
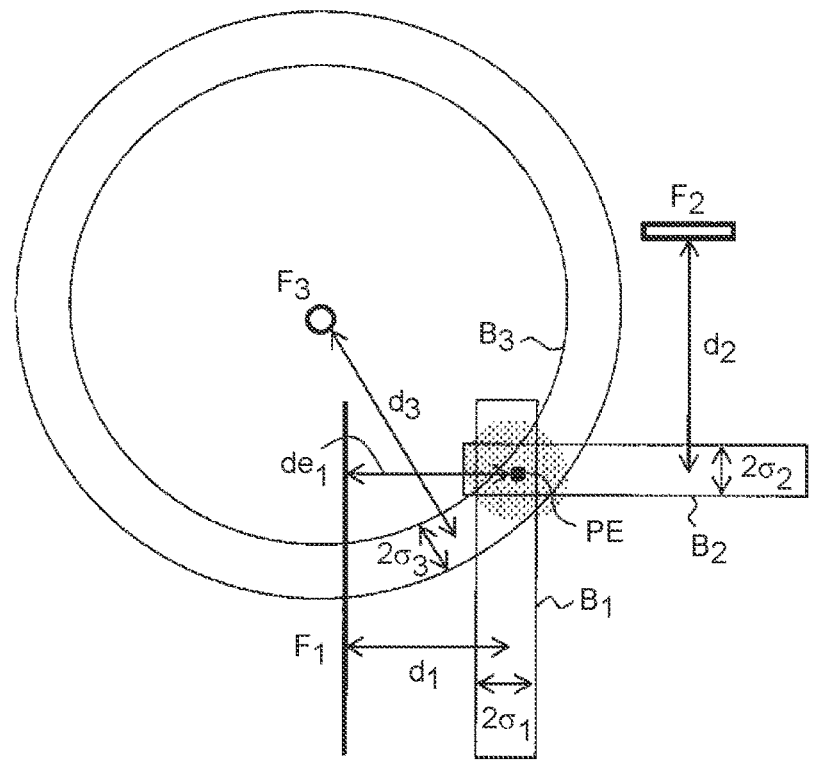
FIG. 28 is a conceptual view for describing an example of own-location estimation in the embodiment of the present disclosure.

FIG. 28 shows the result of own-location estimation. A location PE is estimated as a location of the vehicle 1. A beltlike region $B_i$ in FIG. 28 is defined from a location, a measured distance $d_i$, and a measurement error $\sigma_i$ of a characteristic object $F_i$ registered in the characteristic object map information FE_MAP. More specifically, the beltlike region $B_i$ is distanced by the measured distance $d_i$ from the location of the characteristic object $F_i$, and the beltlike region $B_i$ has a width of $2\sigma_i$. It can be said that the accuracy of the own-location estimation is higher, as an overlapping region where the regions $B_1$ to $B_3$ overlap is larger. On the contrary, when the overlapping region is small, the accuracy of own-location estimation is low, and the own-location estimation error is large.

For quantitative estimation of the own-location estimation error EL, a distance $de_i$ between the location of the characteristic object $F_i$ registered in the characteristic object map information FE_MAP and the estimation location PE is considered. FIG. 28 illustrates a distance $de_i$ between the characteristic object $F_1$ and the estimation location PE. The own-location estimation error EL is expressed by following expression (2), for example:

$$EL = \sqrt{\sum_i \frac{(d_i - de_i)^2}{\sigma_i^2} \bigg/ \sum_i \frac{1}{\sigma_i^2}} \quad (2)$$

One of the factors of the error EL is an error of the location of the characteristic object $F_i$ registered in the characteristic object map information FE_MAP. Therefore, based on the error EL, the evaluation value P of the characteristic object map information FE_MAP can be determined. For example, as the error EL is larger, the evaluation value P becomes lower, whereas as the error EL is smaller, the evaluation value P becomes higher.

5-4. Track Map Information TR_MAP

Figure 29:
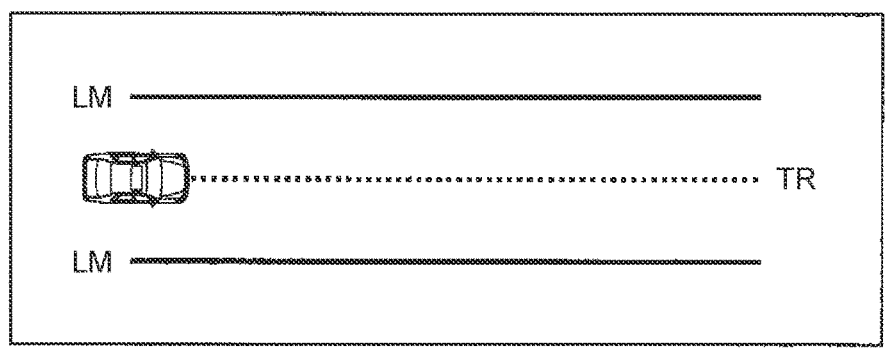
FIG. 29 is a conceptual view for describing an example of track map information in the embodiment of the present disclosure.

FIG. 29 is a conceptual view for describing one example of the track map information TR_MAP. The track map information TR_MAP is map information MAP relating to the track TR of the vehicle 1. More specifically, the track map information TR_MAP indicates the location of a track TR for the vehicle 1 to travel in the conditions where no obstacle is present.

The database management device 30 generates and updates the track map information TR_MAP based on the driving environment information 200 or other map information MAP.

Typically, the track TR extends through the center of a lane. The database management device 30 acquires the location of a lane marking LM that defines a lane from the peripheral condition information 210 or the characteristic object map information FE_MAP. The database management device 30 calculates the center position of the lane from the location of the lane marking LM, and sets the center position of the lane as the track TR.

When it is difficult to calculate the center position of the lane, the database management device 30 acquires the location of a curbstone. The location of the curbstone can be acquired from the peripheral condition information 210, the terrain map information TE_MAP, or the characteristic object map information FE_MAP. The database management device 30 sets the location that is in a constant distance from the curbstone as the track TR.

Alternatively, the database management device 30 may set the track TR based on an actual track at the time of manual driving. The actual track at the time of manual driving is obtained from the vehicle location information 220. For example, the database management device 30 sets an average of two or more actual tracks as the track TR. Thus, the track TR becomes close to the actual track at the time of manual driving. As a result, the discomfort of the driver when the vehicle 1 travels along the track TR is reduced.

As shown in FIG. 29, the evaluation value P is associated with each location [X, Y, Z] on the track TR. The evaluation value P indicates "certainty" of the track map information TR_MAP. For example, the evaluation value P takes a value in the range of 0 to 1.

The evaluation information may include the actual track at the time of manual driving. The evaluation value P becomes high in the location where the track TR is close to the actual track. The evaluation value P becomes low in the location where the track TR deviates from the actual track. When two or more actual tracks are present, an average of the actual tracks is compared with the track TR, for example. Alternatively, the evaluation value P is calculated based on a sum total of the amounts of deviation of the respective actual tracks from the track TR.

The evaluation information may include the aforementioned center position of the lane. The evaluation value P becomes high in the location where the track TR is close to the center position of the lane. The evaluation value P becomes low in the location where the track TR deviates from the center position of the lane.

The evaluation information may include a curvature of the track TR. The evaluation value becomes low in the location where the curvature is large.

The track map information TR_MAP is used for preparation of a travel plan of the vehicle 1, for example. The travel plan includes a target track for the vehicle 1 to travel. The driving assist controller 100 sets the track TR registered in the track map information TR_MAP as a target track. The driving assist controller 100 then performs vehicle travel control such that the vehicle 1 follows the target track. When the track map information TR_MAP is used, it is not necessary to detect a lane marking LM and calculate the center position of the lane one by one. Therefore, a calculation load is reduced. The target track of a section beyond a sensor detection range can also be acquired beforehand. These features are desirable in terms of efficiency of the driving assist control.

5-5. Other Map Information

Examples of other map information MAP may include traffic signal map information indicating the location of traffic signals, and road marking map information indicating the location of road markings. Examples of the road markings may include a stop line, a temporary stop line, and a pedestrian crossing.

The map information MAP may include aforementioned LIDAR measurement information, camera imaging information, and road surface image information. When acquiring these pieces of information, the database management device 30 registers the acquired information in the map database MAP_DB.

6. Map Information Update Process

The database management device 30 according to the present embodiment updates the map information MAP. The map information update process by the database management device 30 will be described below.

6-1. Basic Flow

Figure 30:
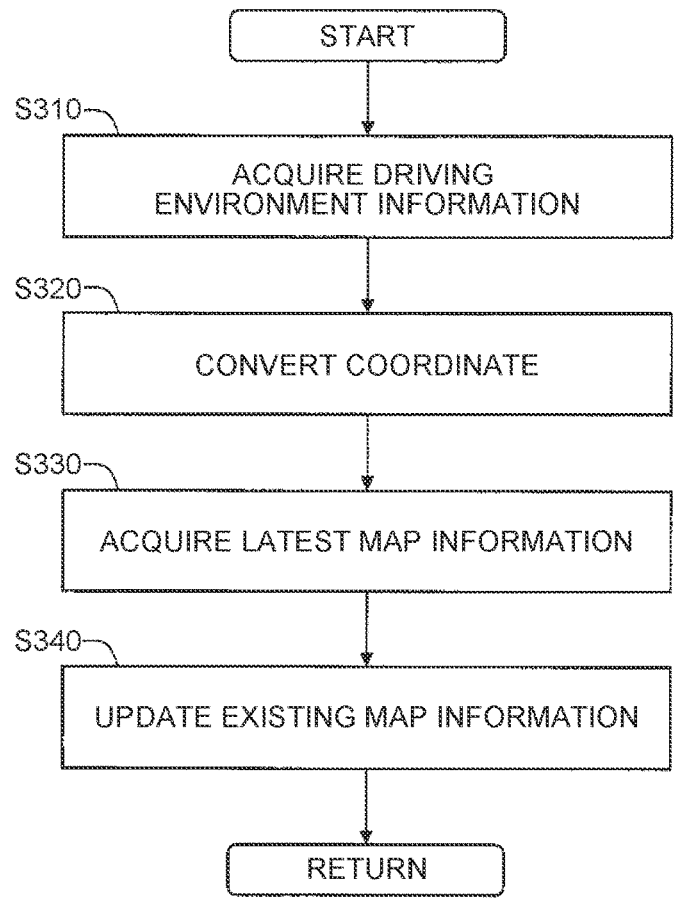
FIG. 30 is a flowchart showing a map information updating process by the database management device according to the embodiment of the present disclosure.

FIG. 30 is a flowchart showing the map information update process. The process flow shown in FIG. 30 is repeatedly executed for each constant cycle.

In step S310, the database management device 30 acquires the driving environment information 200 from the information acquisition device 20.

In step S320, the database management device 30 converts the peripheral condition information 210 into an absolute coordinate system, based on the location and direction of the vehicle 1 indicated by the vehicle location information 220.

In step S330, the database management device 30 acquires the latest map information MAP, based on the driving environment information 200. The database management device 30 acquires the latest map information MAP, based on the peripheral condition information 210 converted into the absolute coordinate system or the vehicle location information 220 in particular. The content of the respective map information MAP and the evaluation value P are as described in Section 5.

In step S340, the database management device 30 updates the existing map information MAP with use of the latest map information MAP obtained in step S330. At the time, in addition to the base map information in the map information MAP, the evaluation information and the evaluation value P are also updated.

It is expected that the evaluation value P (quality) of the map information MAP is improved whenever the vehicle 1 travels on the same road. As the evaluation value P of the map information MAP becomes higher, it becomes possible to conduct the driving assist control of a higher level. The map information MAP can effectively be utilized by performing the driving assist control of an appropriate level corresponding to the evaluation value P of the map information MAP.

6-2. First Modification

In some locations, the error of the driving environment information 200 may be large. For example, the error of the peripheral condition information 210 increases due to noise. In another example, in the location where the own-location estimation error EL is large, the error of the vehicle location information 220 also increases. When the map information update process is performed using the driving environment information 200 having a large error, the evaluation value P may end up lowering.

Accordingly, the database management device 30 performs tentative update of the map information MAP, and calculates a tentative evaluation value P. Furthermore, the database management device 30 extracts the location where the tentative evaluation value P is equal to or less than a prescribed value as an excluding location. The database management device 30 then performs the map information update process again using the driving environment information 200 that excludes the excluding location.

Alternatively, the database management device 30 may compare the evaluation values P before and after the map information update process. When the evaluation value P after the update process is lower than the evaluation value P before the update process, the database management device 30 cancels the update and restores the original map information MAP.

The first modification can prevent undesirable decrease of the evaluation value P of the map information MAP.

6-3. Second Modification

In a second modification, the driving environment information 200 unsuitable for the map information update process is excluded beforehand. For example, the driving environment information 200, acquired in the section where occurrence of sudden steering is frequent, is not suitable for the map information update process. In another example, the driving environment information 200 acquired in rainy weather is not suitable for the map information update process.

From such a perspective, the database management device 30 calculates "suitability ST" indicating a suitable degree of the driving environment information 200 suitable for the map information update process. Shown below are driving environment (factors) causing calculation of a low suitability ST.

(a) Lateral acceleration or longitudinal acceleration exceeding a threshold (basis information: vehicle location information 220, vehicle state information 230).

(b) Curvature of a travel locus of the vehicle 1 exceeding a threshold (basis information: vehicle location information 220)

(c) Traveling locus of the vehicle 1 becoming discontinuous (basis information: vehicle location information 220)

(d) Rainfall, snowfall (basis information: peripheral condition information 210 (camera imaging information, LIDAR measurement information))

(e) Nighttime, backlight (basis information: peripheral condition information 210 (camera imaging information))

(f) Occurrence of stain on the camera lens (basis information: peripheral condition information 210 (camera imaging information))

(g) Density of the LIDAR point group being less than a threshold (basis information: peripheral condition information 210 (LIDAR measurement information))

(h) Occurrence of stain on the LIDAR (basis information: peripheral condition information 210 (LIDAR measurement information))

The database management device 30 calculates the suitability ST based on the basis information. As the degree of each factor becomes larger, the suitability ST becomes lower. The database management device 30 compares the suitability ST with a suitability threshold, and excludes the driving environment information 200 having the suitability ST less than the suitability threshold. In other words, the database management device 30 performs the map information update process with use of the driving environment information 200 having the suitability ST equal to or more than the suitability threshold. This makes it possible to prevent undesirable decrease of the evaluation value P of the map information MAP.

6-4. Third Modification

The database management device 30 may delete a portion of the existing map information MAP where the evaluation value P is low. For example, the database management device 30 extracts from the existing map information MAP a portion where the evaluation value P is equal to or less than a prescribed value, as a deletion target. The database management device 30 then deletes the deletion target from the existing map information MAP. This makes it possible to maintain the quality of the map information MAP constant.

6-5. Fourth Modification

The database management device 30 may perform the map information update process only for the location where the evaluation value P is low in the existing map information MAP. For example, the database management device 30 extracts from the existing map information MAP a region where the evaluation value P is equal to or less than a prescribed value as an update target region. The database management device 30 then performs the map information update process using the driving environment information 200 corresponding to the update target region. This makes it becomes possible to efficiently improve the evaluation value P of the map information MAP with a small calculation amount.

6-6. Fifth Modification

A large change may occur in real environment at certain timing. For example, the shape of a road may drastically change due to road repairing or natural disasters. When the map information update process is repeatedly performed after such a change timing, the evaluation value P may gradually decrease in the change occurrence region. Accordingly, the database management device 30 accumulates a history of the evaluation value P. When there is a region where the evaluation value P continuously reduced a prescribed number of times, the database management device 30 defines the region as the change occurrence region. The database management device 30 deletes the map information MAP relating to the change occurrence area. This makes it possible to restrain deterioration in quality of the map information MAP.

7. Display of Allowable Level of Driving Assist Control

As described in the foregoing, the driving assist level determination device 40 determines the allowable level ALV that is the driving assist level allowed when the vehicle 1 travels in a target range. The driving assist controller 100 performs driving assist control of the allowable level ALV determined by the driving assist level determination device 40. At the time, the driving assist controller 100 (controller 170) may display the allowable level ALV on the display device of the HMI unit 150.

For example, the case where the vehicle 1 travels to the destination along a target route is considered. The driving assist controller 100 sets the target route for the vehicle 1 to travel. The driving assist level determination device 40 determines the allowable levels ALV along the target route. The driving assist controller 100 performs the driving assist control such that the vehicle 1 travels along the target route. At the time, the driving assist controller 100 (controller 170) displays a transition of the allowable level ALV along the target route from a current location or current time on the display device of the HMI unit 150. It is not necessarily needed to display all the allowable levels ALV up to the destination at once. The driving assist controller 100 may selectively display only the allowable levels ALV of a limited range including the current location.

Figure 31:
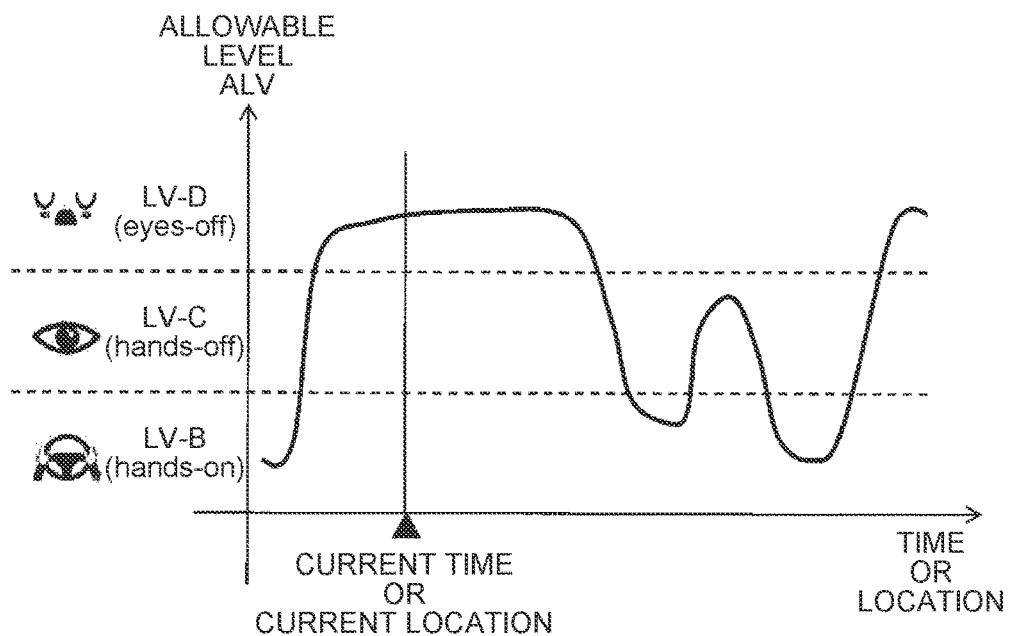
FIG. 31 is a conceptual view showing an example of display of allowable levels in the embodiment of the present disclosure.

FIG. 31 shows an example of the display of the allowable level ALV. A horizontal axis represents time or location along a target route, and a vertical axis represents the allowable level ALV along the target route. In the example shown in FIG. 31, temporal or locational transition of the allowable level ALV is displayed as a graph. An icon indicative of the driver operation (example: eyes-off, hands-off, hands-on) in each allowable level ALV may be displayed. The driver can easily recognize the change in level of future driving assist control in advance.

Figure 32:
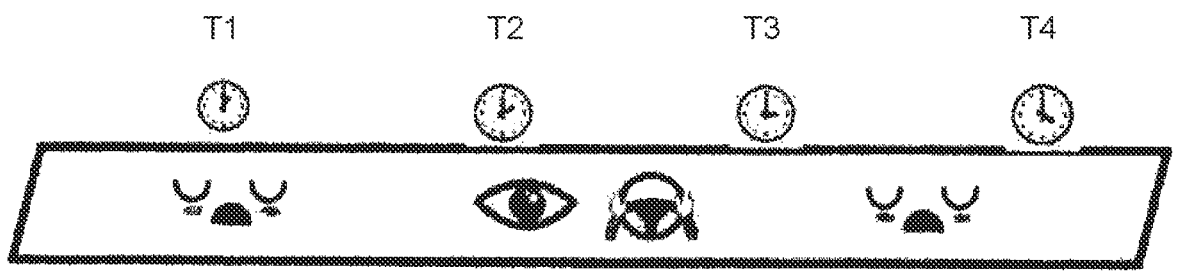
FIG. 32 is a conceptual view showing another example of the display of the allowable levels in the embodiment of the present disclosure.

FIG. 32 shows another example of the display of the allowable level ALV. In the example shown in FIG. 32, only the icons indicative of lapse of time and driver operation in the respective allowable levels ALV are displayed. For example, in a period from time T1 to T2, the allowable level ALV is LV-D. At time T2, the allowable level ALV is switched to LV-B. In a period from time T2 to T3, the allowable level ALV is LV-B. At time T3, the allowable level ALV is switched again to LV-A. The driver can easily recognize the change in level of future driving assist control in advance.

Figure 33:
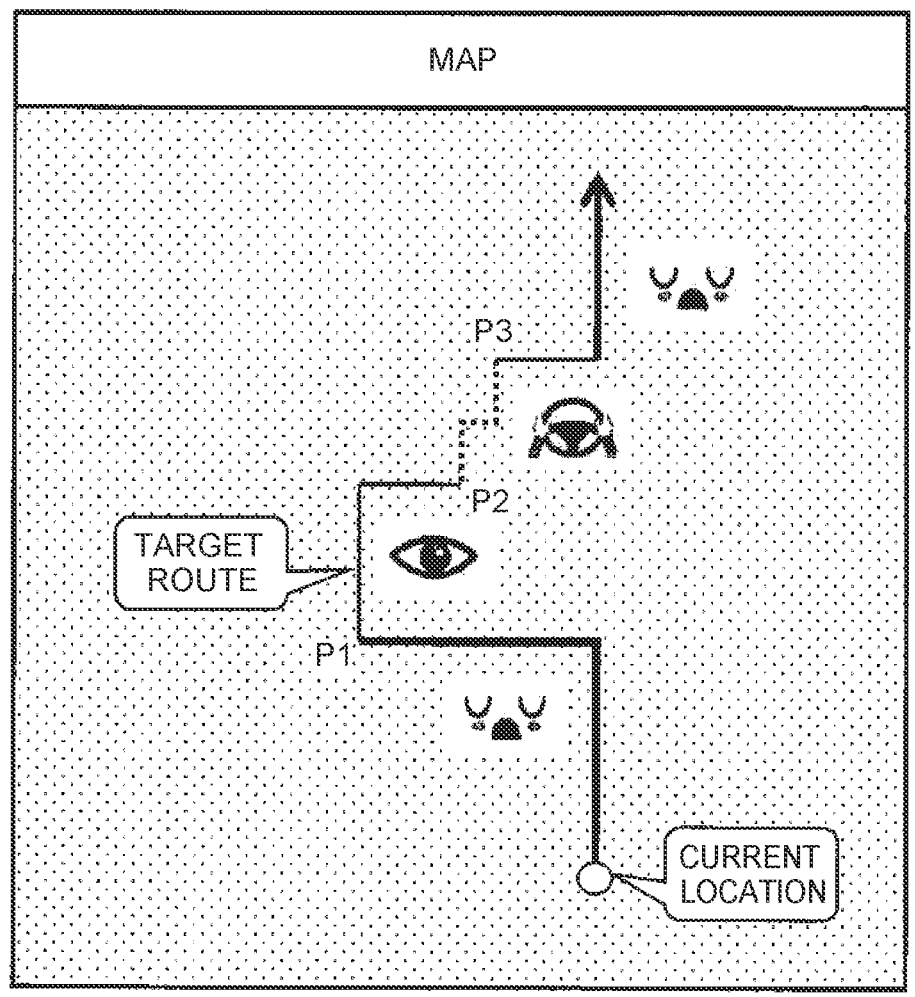
FIG. 33 is a conceptual view showing still another example of the display of the allowable levels in the embodiment of the present disclosure.

FIG. 33 is a conceptual view showing still another example of the display of the allowable level ALV. In the example shown in FIG. 33, the driving assist controller 100 displays the map on the display device. The driving assist controller 100 further displays a transition of the target route and the allowable level ALV so as to be superimposed on the map. The height of the allowable level ALV is distinguishable by changing line fonts or colors. For example, in a section from the current location to a location P1, the allowable level ALV is LV-D. In a section from the location P1 to a location P2, the allowable level is lowered to LV-C. In a section from the location P2 to a location P3, the allowable level ALV is further lowered to LV-B. In the location P3, the allowable level ALV is raised back to LV-D. The icons indicative of the driver operation in each allowable level ALV may be displayed. The information shown in FIG. 33 may be displayed together with the information shown in FIG. 31 or 32.

When a plurality of target route candidates is present, the driving assist controller 100 may display the target route candidates together with the transition of the allowable level ALV. The driver selects a desired target route by referring to the transition of the allowable level ALV. The desired target route is selected by using the input device of the HMI unit 150, for example. The driving assist controller 100 performs the driving assist control such that the vehicle 1 travels along the desired target route.

Thus, the transition of the allowable level ALV along the target route from the current location or current time is displayed, which enables the driver to recognize the change in future driving assist levels in advance. Therefore, the driver can cope with the change in the driving assist level well in advance. This is preferable in terms of convenience.

What is claimed is:
1. A map information system comprising:
  a map database including map information used for driving assist control for assisting driving of a vehicle; and
  a driving assist level determination device configured to determine an allowable level of the driving assist control that is allowed when the vehicle travels in a target range, wherein:

the map information is associated with an evaluation value indicating a certainty of the map information for each location in an absolute coordinate system;

the driving assist level determination device is configured to acquire, based on driving environment information indicating a driving environment of the vehicle, intervention operation information indicating an intervention operation location that is a location where an intervention operation is performed, the intervention operation being an operation performed by a driver of the vehicle representing an intention of the driver to intervene in the driving assist control during execution of the driving assist control, the driving environment information including information indicating that the intervention operation has been performed, acquire, based on the map information, the evaluation value for each point or section within the target range, and determine, based on the evaluation value and the intervention operation location, the allowable level for each point or section within the target range, wherein the allowable level in the intervention operation location is equal to or less than the allowable level in a normal location that is not the intervention operation location, on a condition that the evaluation values in the intervention operation location and the normal location are identical, the driving assist level determination device is configured to:

maintain the evaluation value in a previous position while reducing the evaluation value in the intervention operation location to acquire a corrected evaluation value, set the allowable level to a first level in a location where the corrected evaluation value is less than a first threshold, and set the allowable level to a second level that is higher than the first level in a location where the corrected evaluation value is equal to or more than the first threshold, and when a combination of a plurality of types of map information is used for the driving assist control, the evaluation value of each of the plurality of types of map information is used to obtain two or more allowable levels for a same point or section within the target range, and the two or more allowable levels are combined to determine a final allowable level of the driving assist control.

2. The map information system according to claim 1, wherein the driving assist level determination device is configured to set the allowable level to the first level in a location where the evaluation value is less than a second threshold, set the allowable level to the second level in a location where the evaluation value is equal to or more than the second threshold, and increase the second threshold in the intervention operation location so as to be larger than the second threshold in the previous position.

3. The map information system according to claim 1, further comprising a database management device configured to manage the map database, wherein:

the database management device is configured to acquire the intervention operation information from the driving environment information, and update the map database so as to reduce the evaluation value in the intervention operation location; and the driving assist level determination device is configured to set the allowable level to the first level in a location where the evaluation value is less than a second threshold, and set the allowable level to the second level in a location where the evaluation value is equal to or more than the second threshold.

4. The map information system according to claim 1, further comprising a driving assist controller configured to perform the driving assist control of the allowable level, based on the driving environment information and the map information.

5. The map information system according to claim 4, further comprising a display device mounted on the vehicle, wherein:

the driving assist level determination device is configured to determine the allowable level along the target route for the vehicle to travel; and the driving assist controller is configured to display on the display device a transition of the allowable level from a current location or current time.

6. The map information system according to claim 5, wherein the driving assist controller is configured to display on the display device the target route and the transition of the allowable level so as to be superimposed on a map.

7. The map information system according to claim 1, wherein the intervention operation includes steering, accelerating, and braking operations.

8. A map information system comprising:

a storage device configured to store a map database including map information used for driving assist control for assisting driving of a vehicle; and one or more processors, wherein:

the map information is associated with an evaluation value indicating a certainty of the map information for each location in an absolute coordinate system;

the one or more processors are configured to acquire, based on driving environment information indicating a driving environment of the vehicle, intervention operation information indicating an intervention operation location that is a location where an intervention operation is performed, the intervention operation being an operation performed by a driver of the vehicle representing an intention of the driver to intervene in the driving assist control during execution of the driving assist control, the driving environment information including information indicating that the intervention operation has been performed, acquire, based on the map information, the evaluation value for each point or section in a target range, and determine, based on the evaluation value and the intervention operation location, an allowable level of the driving assist control that is allowed when the vehicle travels within the target range, for each point or section within the target range, wherein the allowable level in the intervention operation location is equal to or less than the allowable level in a normal location that is not the intervention operation location, on a condition that the evaluation values in the intervention operation location and the normal location are identical, the one or more processors are configured to
- maintain the evaluation value in a previous position while reducing the evaluation value in the intervention operation location to acquire a corrected evaluation value,
- set the allowable level to a first level in a location where the corrected evaluation value is less than a first threshold, and
- set the allowable level to a second level that is higher than the first level in a location where the corrected evaluation value is equal to or more than the first threshold, and
- when a combination of a plurality of types of map information is used for the driving assist control, the evaluation value of each of the plurality of types of map information is used to obtain two or more allowable levels for a same point or section within the target range, and the two or more allowable levels are combined to determine a final allowable level of the driving assist control.

9. The map information system according to claim 8, wherein the intervention operation includes steering, accelerating, and braking operations.

10. The map information system according to claim 8, wherein the one or more processors are further configured to
- set the allowable level to the first level in a location where the evaluation value is less than a second threshold,
- set the allowable level to the second level in a location where the evaluation value is equal to or more than the second threshold, and
- increase the second threshold in the intervention operation location so as to be larger than the second threshold in the previous position.

11. The map information system according to claim 8, wherein the one or more processors are further configured to:
- acquire the intervention operation information from the driving environment information,
- update the map database so as to reduce the evaluation value in the intervention operation location,
- set the allowable level to the first level in a location where the evaluation value is less than a second threshold, and
- set the allowable level to the second level in a location where the evaluation value is equal to or more than the second threshold.

12. The map information system according to claim 8, wherein the one or more processors are further configured to perform the driving assist control of the allowable level, based on the driving environment information and the map information.

13. The map information system according to claim 12, further comprising a display device mounted on the vehicle, wherein:
the one or more processors are further configured to:
- determine the allowable level along the target route for the vehicle to travel; and
- display on the display device a transition of the allowable level from a current location or current time.

14. The map information system according to claim 13, wherein the one or more processors are further configured to display on the display device the target route and the transition of the allowable level so as to be superimposed on a map.

* * * * *